United States Patent
Kobayashi et al.

(10) Patent No.: US 7,660,487 B2
(45) Date of Patent: Feb. 9, 2010

(54) IMAGE PROCESSING METHOD AND APPARATUS WITH IMAGE RESOLUTION CONVERSION RELATED TO RELATIVE MOVEMENT DETECTION

(75) Inventors: Seiji Kobayashi, Tokyo (JP); Hideki Oyaizu, Tokyo (JP); Yasutaka Hirasawa, Tokyo (JP)

(73) Assignee: Sony Corporation, Tokyo (JP)

( * ) Notice: Subject to any disclaimer, the term of this patent is extended or adjusted under 35 U.S.C. 154(b) by 870 days.

(21) Appl. No.: 11/006,384

(22) Filed: Dec. 7, 2004

(65) Prior Publication Data

US 2005/0128307 A1   Jun. 16, 2005

(30) Foreign Application Priority Data

Dec. 10, 2003  (JP)  ............................ P2003-412499
Dec. 10, 2003  (JP)  ............................ P2003-412500

(51) Int. Cl.
*G06K 9/32* (2006.01)
*H04N 11/04* (2006.01)
*H04N 9/76* (2006.01)

(52) U.S. Cl. .................... 382/299; 375/240.16; 348/598

(58) Field of Classification Search .................. 382/299
See application file for complete search history.

(56) References Cited

U.S. PATENT DOCUMENTS 4,750,210 A * 6/1988 Lindsay et al. .............. 382/291
5,159,453 A * 10/1992 Dhein et al. ................ 348/598
5,502,489 A   3/1996 Kim et al.
5,659,365 A * 8/1997 Wilkinson ............. 375/240.15
5,835,104 A * 11/1998 Hicok et al. ................ 345/568

(Continued)

FOREIGN PATENT DOCUMENTS

EP         0 993 198 A2      4/2000

(Continued)

OTHER PUBLICATIONS

Sean Borman, Robert Stevenson; Spatial Resolution Enhancement of Low-Resolution Image Sequences A Comprehensive Review with Directions for Future Research; Research Report; Jul. 8, 1998.

(Continued)

*Primary Examiner*—Bhavesh M Mehta
*Assistant Examiner*—David P Rashid
(74) *Attorney, Agent, or Firm*—Sonnenschein Nath & Rosenthal LLP

(57) ABSTRACT

When an output unit is capable of operation at a frame rate F and a resolution of x×y pixels, an imaging unit or an image input unit converts an image into an imaged frame in an internal data format having the frame rate F and a resolution of ix×jy pixels. An image converter converts the resolution of the imaged frame supplied from the imaging unit or the image input unit into a resolution that can be represented by the output unit, generating an output frame having x×y pixels. At this time, the image converter carries out predetermined resolution conversion based on a moving velocity of the image by blocks each having a predetermined size. Thus, such visual effect that an observer of the image of the output frame perceives the image at a resolution exceeding the actual resolution of the output frame is achieved.

16 Claims, 25 Drawing Sheets

U.S. PATENT DOCUMENTS

| | | | |
|---|---|---|---|
| 5,946,044 A * | 8/1999 | Kondo et al. | 348/458 |
| 6,072,834 A | 6/2000 | Kim et al. | |
| 6,288,722 B1 * | 9/2001 | Narayanaswami | 345/619 |
| 6,340,994 B1 * | 1/2002 | Margulis et al. | 348/625 |
| 2001/0002932 A1 * | 6/2001 | Matsuo et al. | 382/118 |
| 2002/0057279 A1 * | 5/2002 | Jouppi | 345/619 |
| 2004/0176821 A1 * | 9/2004 | Delbeke et al. | 607/54 |
| 2004/0264580 A1 * | 12/2004 | Chiang Wei Yin et al. | 375/240.25 |
| 2005/0129272 A1 * | 6/2005 | Rottman | 382/103 |

FOREIGN PATENT DOCUMENTS

| | | |
|---|---|---|
| JP | 01-200882 | 8/1989 |
| JP | 08-018976 | 1/1996 |
| JP | 2003-189183 | 7/2003 |
| JP | 2003-338988 | 11/2003 |

OTHER PUBLICATIONS

Callico, G.M. et al., "A low-cost implementation of super-resolution based on a video encoder," Proceedings of the 28$^{th}$ Annual Conference of the IEEE Industrial Electronics Society. Sevilla, Spain, Nov. 5-8, 2002, Annual Conference of the IEEE Industrial Electronics Society, New York, NY, vol. 1 of 4, Conf. 28, Nov. 5, 2002, pp. 1439-1444.

Elliger, B., "Analysis of motion compensated filters concerning motion correctness and accuracy," Signal Processing. Image Communication, Elsevier Science Publishers, Amsterdam, NL, vol. 14, No. 9, Jul. 1999, pp. 697-720.

Japanese Office Action issued on Mar. 24, 2009 corresponding to JP Application No. 2003-412499.

* cited by examiner

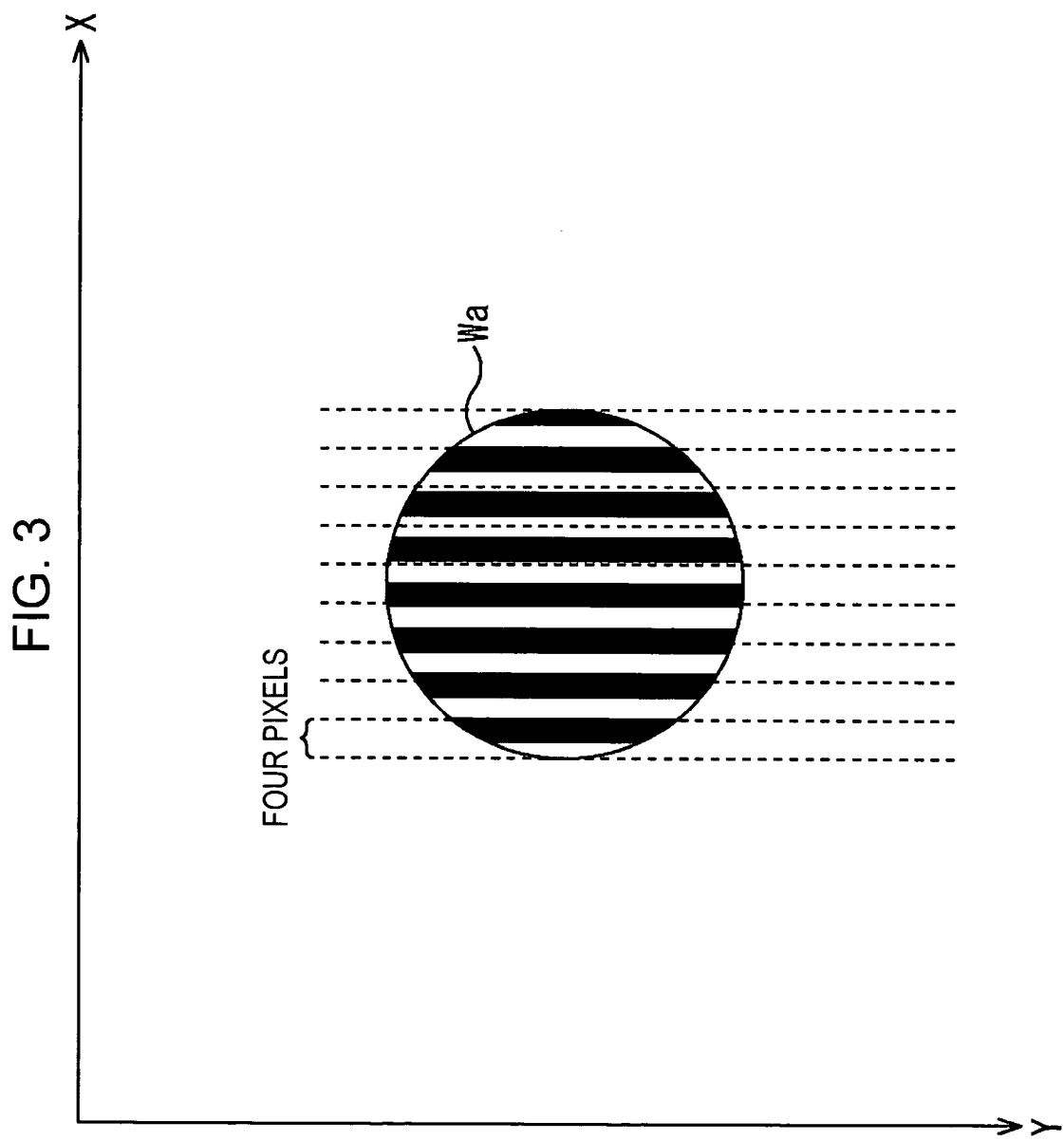

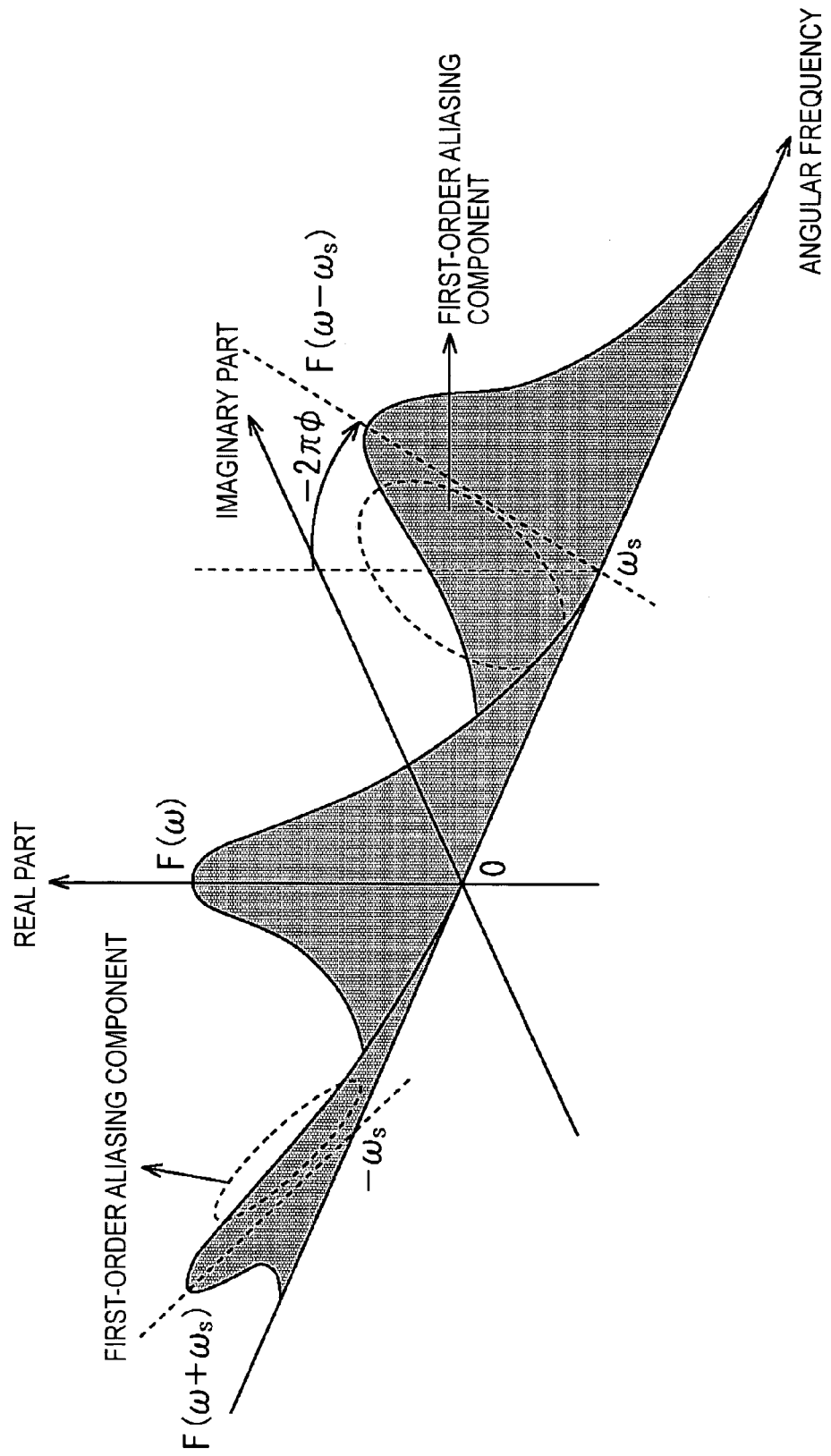

US 7,660,487 B2

IMAGE PROCESSING METHOD AND APPARATUS WITH IMAGE RESOLUTION CONVERSION RELATED TO RELATIVE MOVEMENT DETECTION

BACKGROUND OF THE INVENTION

1. Field of the Invention

The present invention relates to image processing methods and apparatuses and to programs. More specifically, the present invention relates to an image processing method and apparatus and a program with which the resolution of an image is converted in each block of a predetermined size based on an amount of movement before the image is output.

2. Description of the Related Art

Recently, digital video cameras often include imaging devices having a resolution higher than a resolution for recording moving images, mainly for the purpose of capturing high-definition still images. In such digital video cameras, when recording moving images, conversion from an imaging resolution to a recording resolution, i.e., reduction in resolution, is needed.

As methods for reducing resolution in solid-state imaging devices such as charge coupled device (CCD) imaging devices or complementary metal oxide semiconductor (CMOS) imaging devices, for example, a method of decimating imaging pixels for reading by controlling a driving method, and a method of summing signals of a plurality of pixels for reading, as disclosed in Japanese Unexamined Patent Application Publication No. 11-331706 and Japanese Unexamined Patent Application Publication No. 2003-78919, are known.

It is known that CCD imaging devices or CMOS imaging devices allow imaging at a high frame rate when the devices are driven at a high speed.

As methods for allowing an observer of an image displayed on a display to perceive the image at a resolution exceeding an actual resolution of the image, according to a first method disclosed in Japanese Unexamined Patent Application Publication No. 6-18836, a plurality of liquid crystal display elements is used, and images are combined while optically shifting positions using half mirrors or the like. According to a second method disclosed in Japanese Unexamined Patent Application Publication No. 6-324320, what is called wobbling is performed, i.e., the optical axis of light coming from liquid crystal display elements is optically vibrated to shift pixel positions. Perception of an image by an observer at a resolution exceeding an actual resolution of the image displayed will hereinafter be referred to as a super-resolution effect.

However, conversion of resolution by decimation causes decrease in sampling rate and therefore causes aliasing, causing degradation in the quality of moving images. Furthermore, conversion of resolution by summing pixel signals limits resolution by output resolution.

As for the first method mentioned earlier, in order to achieve high resolution, a plurality of display elements, and optical elements for combining lights output from the plurality of display elements, are needed. Thus, cost of the apparatus is high, the structure is complex, and compact design is inhibited.

As for the second method mentioned earlier, in order to achieve high resolution, optical elements for optically shifting an optical axis is needed. This leads to increased cost due to the optical elements for wobbling, and requires a complex driving method.

SUMMARY OF THE INVENTION

The present invention has been made in view of the situation described above. According to the present invention, it is possible to convert an input image into an output image by carrying out adaptive image processing when outputting a moving image so that an observer of the output image will not perceive degradation in image quality due to a reduced resolution.

According to an aspect of the present invention, an image processing method is provided. The image processing method includes an image input step of inputting image signals having a first resolution; a resolution converting step of converting the image signals input in the image input step into image signals having a second resolution, the second resolution being lower than the first resolution; and an output step of outputting an image corresponding to the image signals having the second resolution at a predetermined frame rate. The resolution converting step detects an amount of movement in at least a partial region of an image corresponding to the image signals input in the image input step, and converts resolution of the region based on the amount of movement detected.

According to another aspect of the present invention, an image processing method is provided. The image processing method includes an image input step of inputting image signals having a first resolution; a resolution converting step of converting the image signals obtained in the image input step into image signals having a second resolution, the second resolution being lower than the first resolution; and an output step of outputting an image corresponding to the image signals having the second resolution at a predetermined frame rate. The resolution converting step divides the image signals obtained in the image input step into a plurality of regions and detects amounts of movement in the respective regions, and sets amounts of spatial decimation for the respective regions based on the amounts of movement detected, and wherein the resolution converting step applies spatial filtering on the respective regions of the image signals obtained in the image input step before applying spatial decimation on the respective regions based on the amounts of spatial decimation set for the respective regions.

According to another aspect of the present invention, an image processing apparatus is provided. The image processing apparatus includes an image input unit for inputting image signals having a first resolution; a resolution converting unit for converting the image signals obtained by the image input unit into image signals having a second resolution, the second resolution being lower than the first resolution; and an output unit for outputting the image signals having the second resolution at a predetermined frame rate. The resolution converting unit includes a movement-amount detector for detecting an amount of movement in at least a partial region of an image corresponding to the image signals obtained by the image input unit, and a resolution converter for converting resolution of the region based on the amount of movement detected.

According to another aspect of the present invention, an image processing apparatus is provided. The image processing apparatus includes an image input unit for inputting image signals having a first resolution; a resolution converting unit for converting the image signals obtained by the image input unit into image signals having a second resolution, the second resolution being lower than the first resolution; and an output unit for outputting the image signals having the second resolution at a predetermined frame rate. The resolution converting unit includes a movement-amount detector for dividing the image signals obtained by the image input unit into a plurality of regions and detecting amounts of movement in the respective regions, and a resolution converter for setting amounts of spatial decimation for the respective regions based on the amounts of movement detected and for applying spatial filtering on the respective regions of the image signals obtained by the image input unit before applying spatial decimation on the respective regions based on the amounts of spatial decimation set for the respective regions.

According to another aspect of the present invention, an imaging program is provided. The imaging program includes an image input step of inputting image signals having a first resolution; a resolution converting step of converting the image signals input in the image input step into image signals having a second resolution, the second resolution being lower than the first resolution; and an output step of outputting an image corresponding to the image signals having the second resolution at a predetermined frame rate. The resolution converting step detects an amount of movement in at least a partial region of an image corresponding to the image signals input in the image input step, and converts resolution of the region based on the amount of movement detected.

According to the present invention, it is possible to convert a captured image into an output image so that an observer of the reproduced output image is allowed to perceive the output image at a resolution exceeding a maximum output resolution.

BRIEF DESCRIPTION OF THE DRAWINGS

FIG. 3 is a diagram for explaining sampling positions;

FIG. 4 is a diagram for explaining aliasing components;

DESCRIPTION OF THE PREFERRED EMBODIMENTS

Now, embodiments of the present invention will be described. The aspects of the present invention described in this specification correspond to embodiments of the present invention, for example, as described below.

The description is intended to assure that embodiments supporting the aspects of the present invention described in this specification are described in this specification.

Thus, even if an embodiment in the following description is not described as relating to an aspect of the present invention, it does not necessarily mean that the embodiment does not relate to the aspect of the present invention.

Conversely, even if an embodiment is described herein as relating to an aspect of the present invention, it does not necessarily mean that the embodiment does not relate to other aspects of the present invention.

Furthermore, the description does not mean all the aspects of the present invention described in this specification. That is, the description does not deny existence of aspects of the present invention that are not claimed in this application, i.e., existence of aspects of the present invention that may be filed by a divisional application, or that may appear or that may be added by amendments.

In an imaging device according to an embodiment of the present invention, a moving image captured by imaging is converted into an image having an output resolution before being output. At that time, resolution is converted using the super-resolution effect based on certain visual characteristics so that an observer will not perceive degradation in image quality due to the conversion of resolution.

In an image display device according to an embodiment of the present invention, an input image is converted into a display image having a resolution lower than that of the input image, and the display image is displayed. At that time, resolution is converted based on certain visual characteristics so that an observer will perceive the image at a resolution exceeding the resolution of the display image, i.e., the super-resolution effect is achieved.

First, the visual characteristics and the super-resolution effect will be described.

Human vision has a function of perceiving light when the sum of optical stimulation received has reached a certain threshold (hereinafter referred to as a temporal integration function). That is, optical perception is based on temporally integrated sum of light irrespective of the distribution of optical stimulation in a period in which the optical stimulation is presented. The threshold of stimulation at which optical perception becomes possible decreases as the period of presenting stimulation becomes longer, and the threshold increases as the presentation time becomes shorter.

This relationship is known as "Bloch's law", and the following equation holds, in which I denotes a threshold intensity of stimulation, T denotes a time of presenting stimulation, and k is a constant.

$$I \times T = k$$

Figure 1:
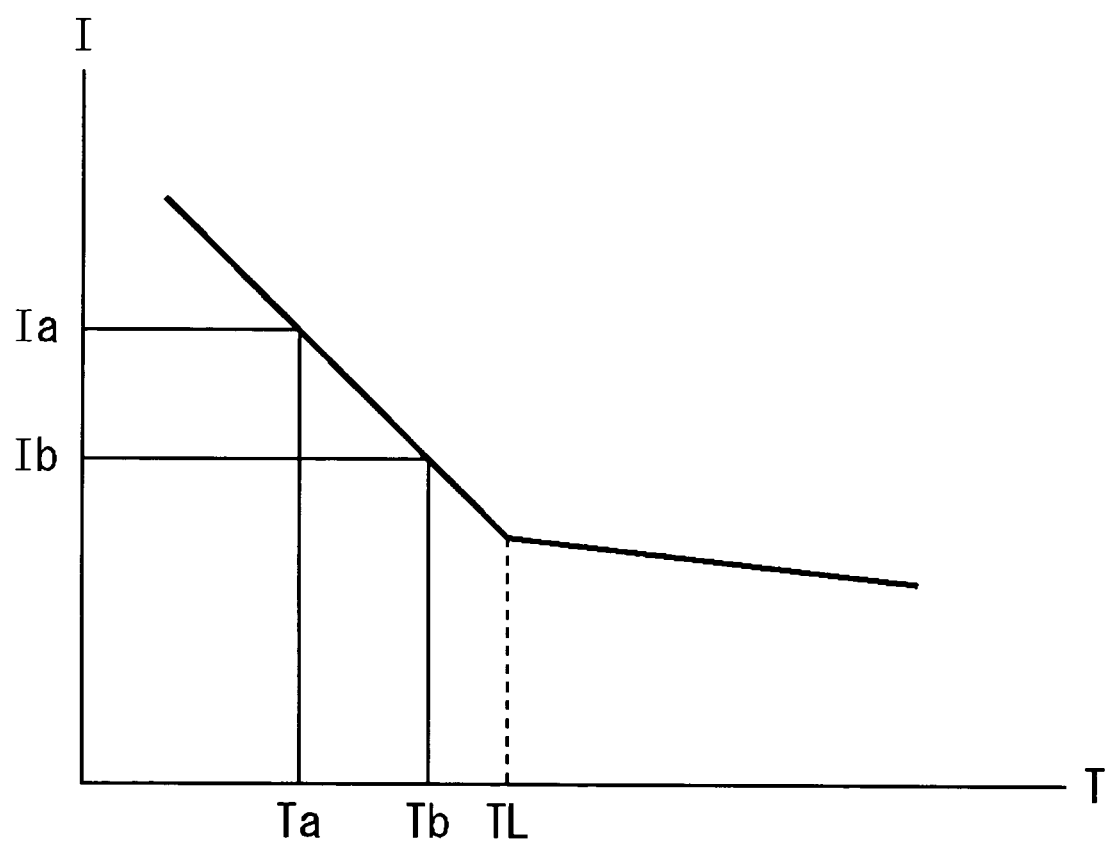
FIG. 1 is a diagram for explaining Bloch's law.

The relationship can also be expressed as shown in FIG. 1, in which the horizontal axis represents stimulation presenting time T and the vertical axis represents threshold intensity I. The curve shown in FIG. 1 is known as the threshold presenting time curve.

According to the threshold presenting time curve shown in FIG. 1, a human being perceives the same brightness when an impulse of light having an intensity Ia is presented for a time Ta and when a light having an intensity Ib that is 1/n of Ia is continuously presented for a time Tb that is n times as long as the time Ta.

Although Bloch's law holds up to a certain time (a time TL in the example shown in FIG. 1) of stimulation presenting time (as represented by a right-decreasing straight line up to the time TL), after the time TL, the threshold depends only on the intensity of stimulation (i.e., the threshold does not change with the presentation time). Thus, the threshold presenting time curve exhibits characteristics represented by a bent line.

The maximum stimulation presenting time TL within which Bloch's law holds is referred to as a critical presentation time.

The time TL varies depending on conditions of presenting stimulation, such as the intensity of background light, but is reported to be on the order of 25 to 100 ms.

Bloch's law is described in detail, for example, in "Shikaku jouhoushori handobukku", the Vision Society of Japan, pp. 219-220.

Human vision also has a function of maintaining stimulation for a certain period once the stimulation is perceived, even after presentation of the stimulation has finished (hereinafter referred to as a perception memory function). Many reports demonstrate that the time of maintaining stimulation is on the order of 10 to 200 ms. The function is also referred to as iconic memory or visual duration, and is described, for example, in "Shikaku jouhou handobukku, the Vision Society of Japan, pp. 229-230.

Next, the super-resolution effect that is achieved based on visual characteristics will be described.

In this embodiment, the super-resolution effect is based on visual characteristics that an observer perceives a sum of a plurality of images within a certain period. This can be considered as arising from complex relationship between the temporal integration function and the perception memory function described above. In the following description, however, this is considered as arising from the temporal integration function.

Figure 2C:
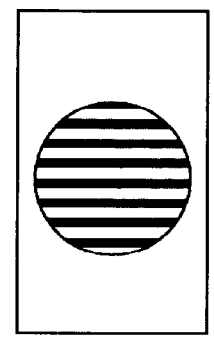
FIGS. 2A to 2C are diagrams for explaining the principles of resolution conversion.
Figure 2B:
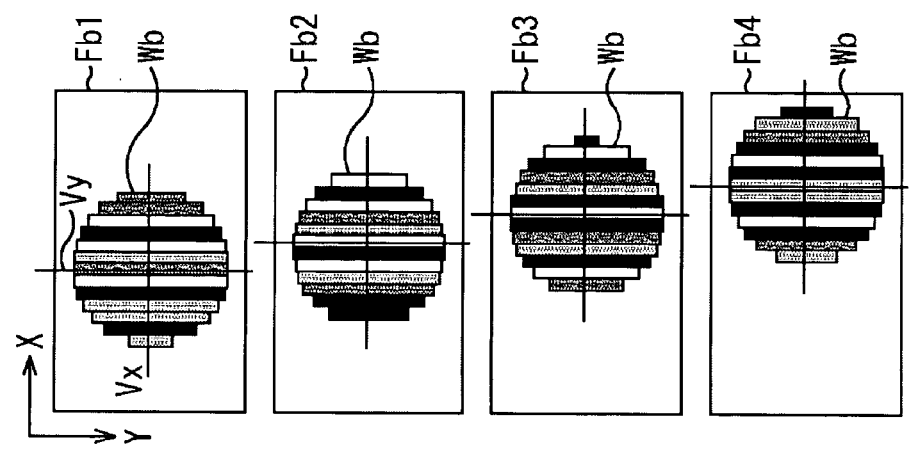
Figure 2A:
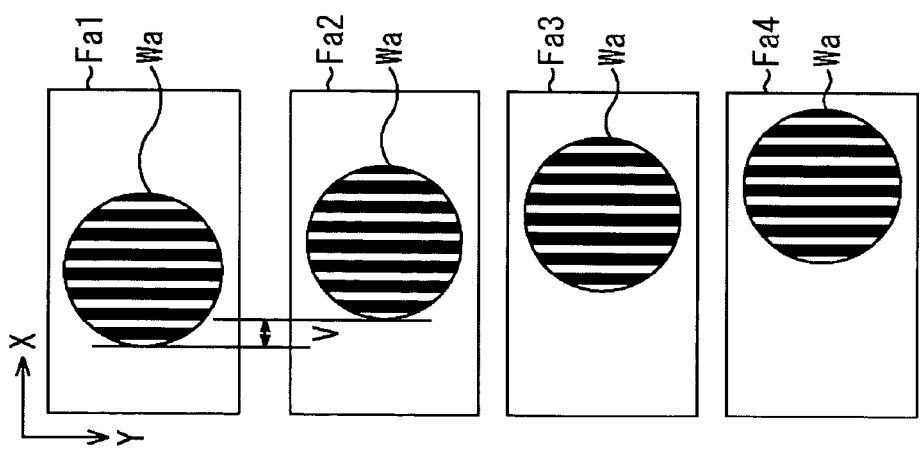

For example, when an object that moves horizontally is imaged at a predetermined frame rate (hereinafter referred to as an input-image frame rate) and a predetermined sampling rate (hereinafter referred to as an input-image sampling rate), as shown in FIG. 2A, input frames Fa in which an object image Wa moves to the right as viewed in FIG. 2A (in the direction of the X axis) at a velocity v (pixels/frame) is obtained. FIG. 2A shows four successive input frames Fa1 to Fa4.

The input frames Fa are sampled at a sampling rate that is 1/m of the input-image sampling rate (hereinafter referred to as a display-image sampling rate) with respect to the X-axis direction (i.e., the direction of movement of the object image Wa). That is, the input frames Fa are decimated by a decimation amount m. In the example shown in FIG. 2A, since the input frames Fa are decimated by a decimation amount of 4, display frames Fb in which the resolution with respect to the X-axis direction is reduced to ¼ (i.e., more rough, or image quality is degraded, with respect to the X-axis direction) are obtained, as shown in FIG. 2B. The display frames Fb include an image obtained by decimating the object image Wa of the input frames Fa by a decimation amount of 4 (hereinafter referred to as a display object image Wb).

The display frames Fb are then displayed at a predetermined frame rate (hereinafter referred to as a display-image frame rate). Thus, an observer perceives an image obtained by integrating a plurality of display frames Fb displayed in an integration period of the temporal integration function described earlier.

It is assumed herein that vision of the observer tracks the display object image wb in the display frames Fb. In this case, since the viewpoint of the observer is constantly located at the center of the display object image Wb, the display object image Wb on the retinas of the observer is substantially stationary.

In FIG. 2B, coordinate axes Vx and Vy represent coordinates on the retinas, and coordinate axes X and Y represent coordinates on frames. (Both are shown on the display frame Fb1 in FIG. 2B, and not shown on display frames Fb2 to Fb4.) The orientation of the coordinate system defined by the coordinate axes Vx and Vy is the opposite of the orientation of the coordinate system defined by the coordinate axes X and Y since an inverted image of a real image is formed on the retinas.

As indicated by dotted lines in FIG. 3, the display frames Fb are sampled at predetermined positions of the frames, in this example, at an interval of four pixels. Thus, when the amount of movement is not an integer multiple of the sampling interval, the sampled position of the object image Wa shifts by v per frame, so that the display object images Wb in the display frames Fb are formed by parts of the object image Wa in accordance with the shift of sampling position.

For example, when the moving velocity v of the object image Wa is 1 pixel/frame, the movement amount between frames (i.e. 1 pixel) is not a multiple of the sampling interval (i.e., 4 pixels), so that the sampled position of the object image Wa is shifted by one pixel with respect to the X-axis direction. Thus, in this case, the display object images Wb of the display frames Fb are formed by parts of the object image Wa in accordance with the shift.

When the display object images Wb are formed by parts of the object image Wa in accordance with the shift of sampling position, the display object images Wb are integrated by the vision over a plurality of frames, whereby an image having more pixels than the display object images Wb, i.e., a resolution higher than that of the display object images Wb (hereinafter referred to as a super-resolution), is perceived.

For example, the integration time of the vision characteristics corresponds to the display period of the four display frames Fb in FIG. 2B so that four display object images Wb of the display frames Fa1 to Fa4 are integrated, an image having a resolution that is approximately four times as high as that of the display object images Wb, i.e., substantially the same resolution as that of the object image Wa, is perceived, as shown in FIG. 2C.

The super-resolution effect is achieved by the principles described above. However, decimation causes aliasing components, which translate to aliasing noise, causing degradation in image quality.

This embodiment attempts to remove the aliasing components as described below.

Expression (1) expresses a signal fs(x) obtained by sampling a first-order original signal f(x) at an interval X. In expression (1), δ(x) denotes a delta function.

Expression (2) expresses a Fourier transform Fs(ω) of the sampled signal fs(x). In expression (2), F(ω) denotes a Fourier transform of the original signal f(x), and ωs denotes a sampling angular frequency.

$$f_s(x) = \sum_{k=-\infty}^{\infty} f(kX)\delta(x - kX) \qquad (1)$$

$$F_s(\omega) = \frac{1}{X} \sum_{k=-\infty}^{\infty} F(\omega - k\omega_s) \qquad (2)$$

Expression (3) expresses a Fourier transform Fsφ(ω) of a signal fsφ(x) that is obtained by sampling, at the interval X, the original signal f(x) as shifted by φ in the real space.

$$F_{s\phi}(\omega) = \frac{1}{X} \sum_{k=-\infty}^{\infty} F(\omega - k\omega_s) e^{-j2\pi k\phi} \qquad (3)$$

Expression (3) indicates that the fundamental wave with k=0 corresponds to the original signal, and an n-th order harmonic wave with k=n is shifted by 2πnφ.

As described earlier, assuming that the object image Wa is horizontally moving at a certain velocity v and that the object image Wa is decimated by 1/m with respect to the direction of movement, the original signal has a bandwidth that is m times as large as the Nyquist frequency of the display frames Fb. Thus, the sampling signal fsφ(x) decimated by 1/m has aliasing components. In expression (3), k=0 yields a component of the original signal, and k=1, 2, . . . and (m−1) yield aliasing components.

FIG. 4 shows a Fourier transform Fsφ(ω) in a case where the decimation amount m=2. In this case, the bandwidth of the original signal is twice as large as that of the Nyquist frequency, and the sampling signal fsφ(x) decimated by 1/m has first-order harmonic aliasing component. As will be understood from FIG. 4, the sampling signal fsφ(x) maintains the Fourier transform component F(ω) of the original signal f(x). The first-order harmonic waves F(ω-ωs) and F(ω+ωs) with k=1 are aliased with phase shifts of −2πφ and 2πφ, respectively.

When the interval of decimation is 1/m, the sampling signal fsφ(x) decimated by 1/m has first-order to (m−1)-th-order aliasing components, and the phases of the aliasing components are shifted by 2πkφ. The sampling signal fsφ(x) is obtained by decimating by 1/m the original signal f(x) as shifted by φ, so that the sampling signal fsφ(x) can be considered as corresponding to an arbitrary single display frame Fb in FIG. 2B.

Now, signals of the display frames Fb at different times in FIG. 2B will be considered.

When the object (represented by the original signal f(x)) is moving horizontally at a velocity v, the phases of the sampling points vary among frames, as shown in FIG. 3. Thus, the amount φ of shift of the sampling point in expression (3) is a function of time t, and depends on the velocity v (pixels/frame) and the decimation amount m (pixels) as expressed in expression (4). In expression (4), T denotes a time interval, which is the inverse of a frame rate.

$$\phi_t = \frac{v}{m}\frac{t}{T} \qquad (4)$$

As will be understood from expression (4), the amount of shift φ0=0 at t=0, and the amount of shift increases by v/m as time t changes as t=T, 2T, 3T, . . . .

Assigning expression (4) into expression (3) yields phases of aliasing components at respective timings.

Figure 5:
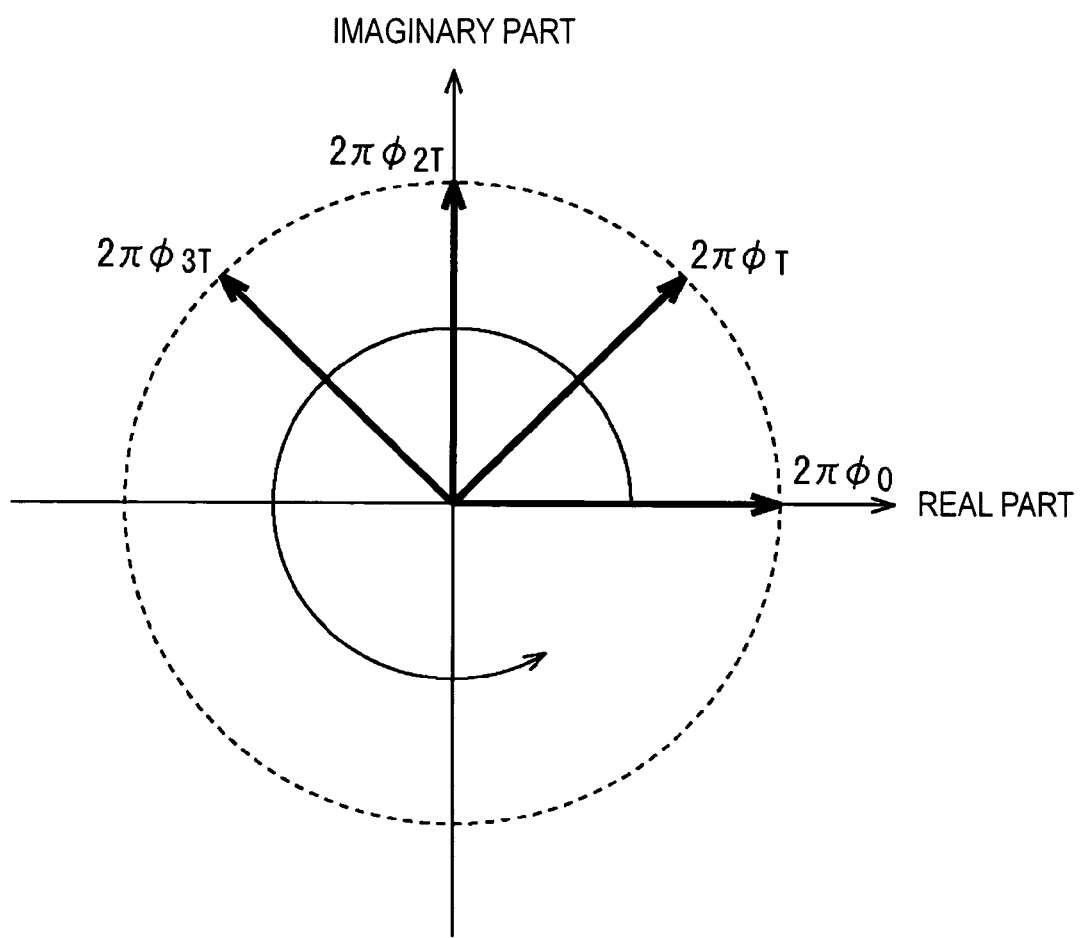
FIG. 5 is a diagram for explaining change in the phases of aliasing components.

FIG. 5 shows the phases of first-order aliasing components at time t=0, T, 2T, 3T, . . . .

Figure 6:
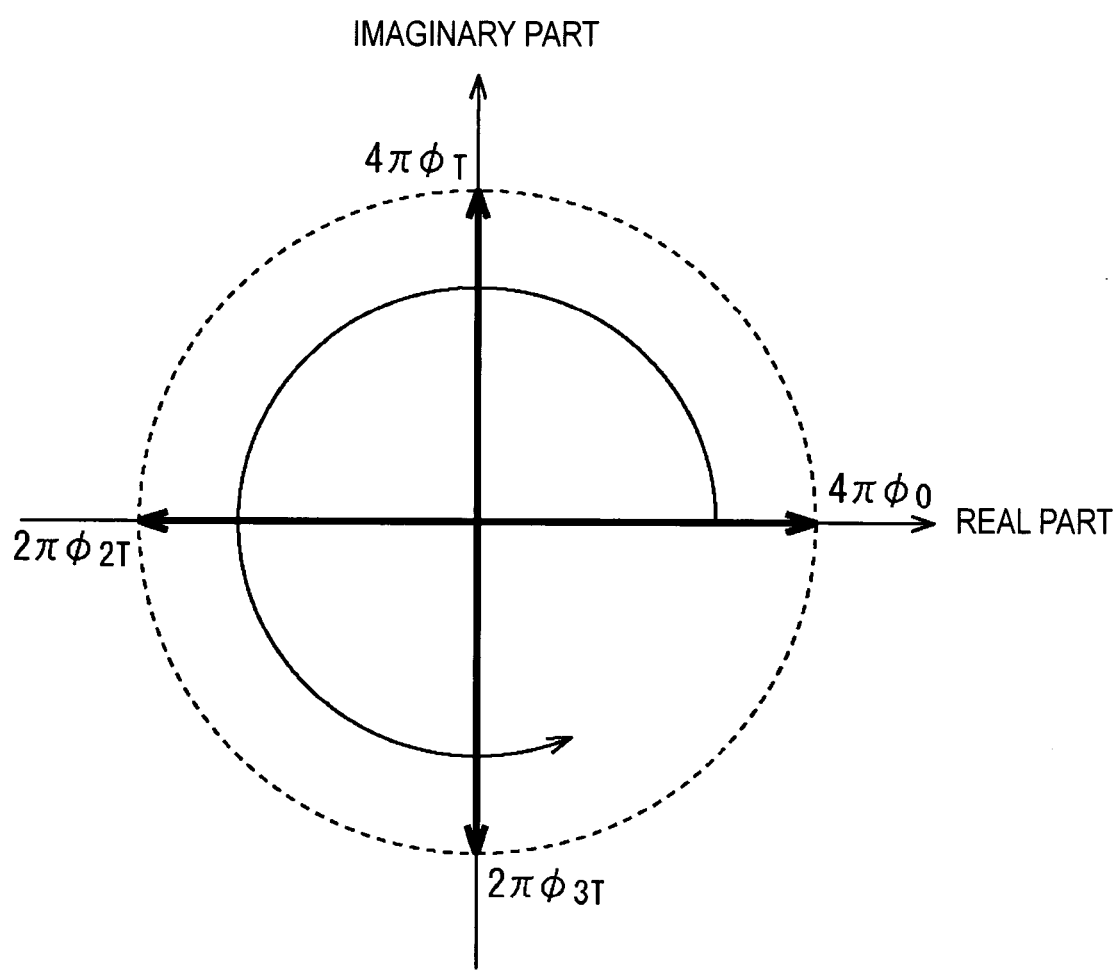
FIG. 6 is another diagram for explaining change in the phases of aliasing components.
Figure 7:
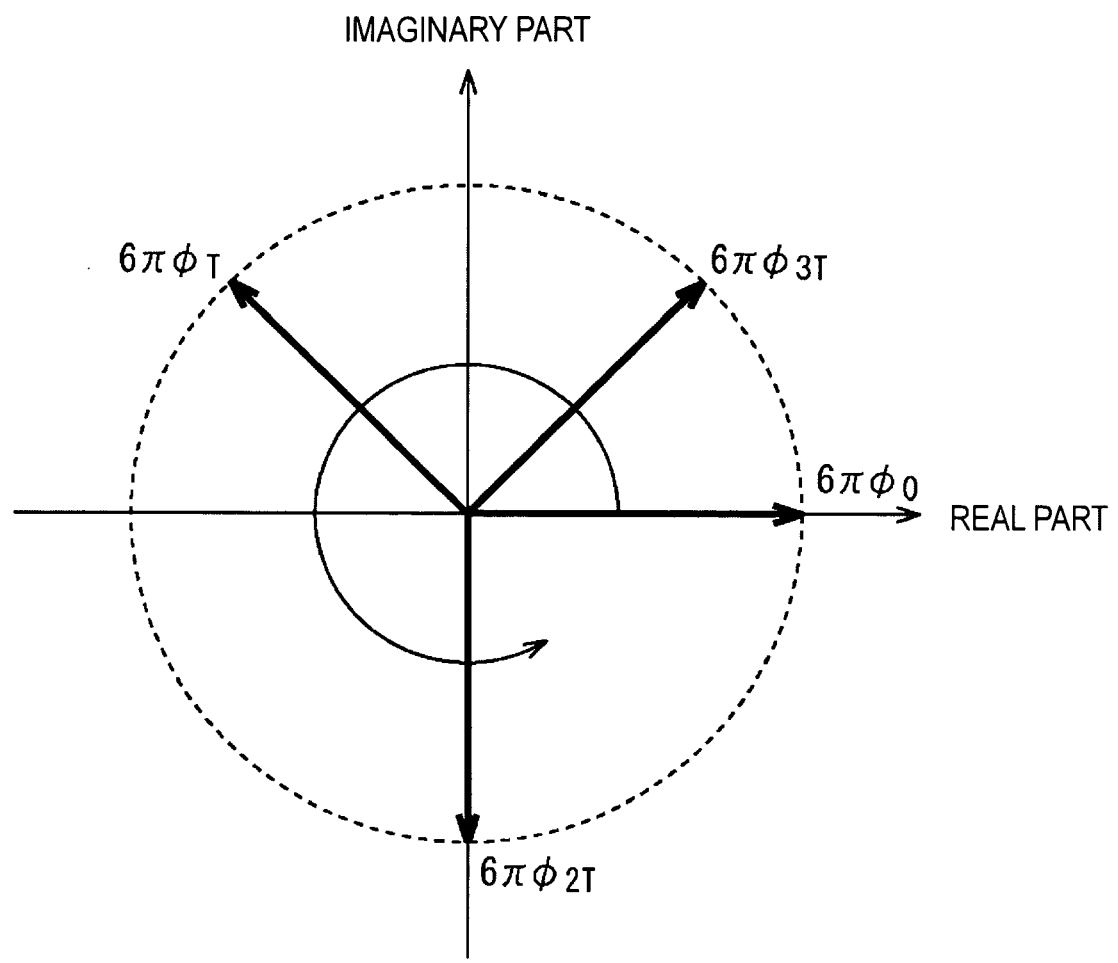
FIG. 7 is another diagram for explaining change in the phases of aliasing components.
Figure 8:
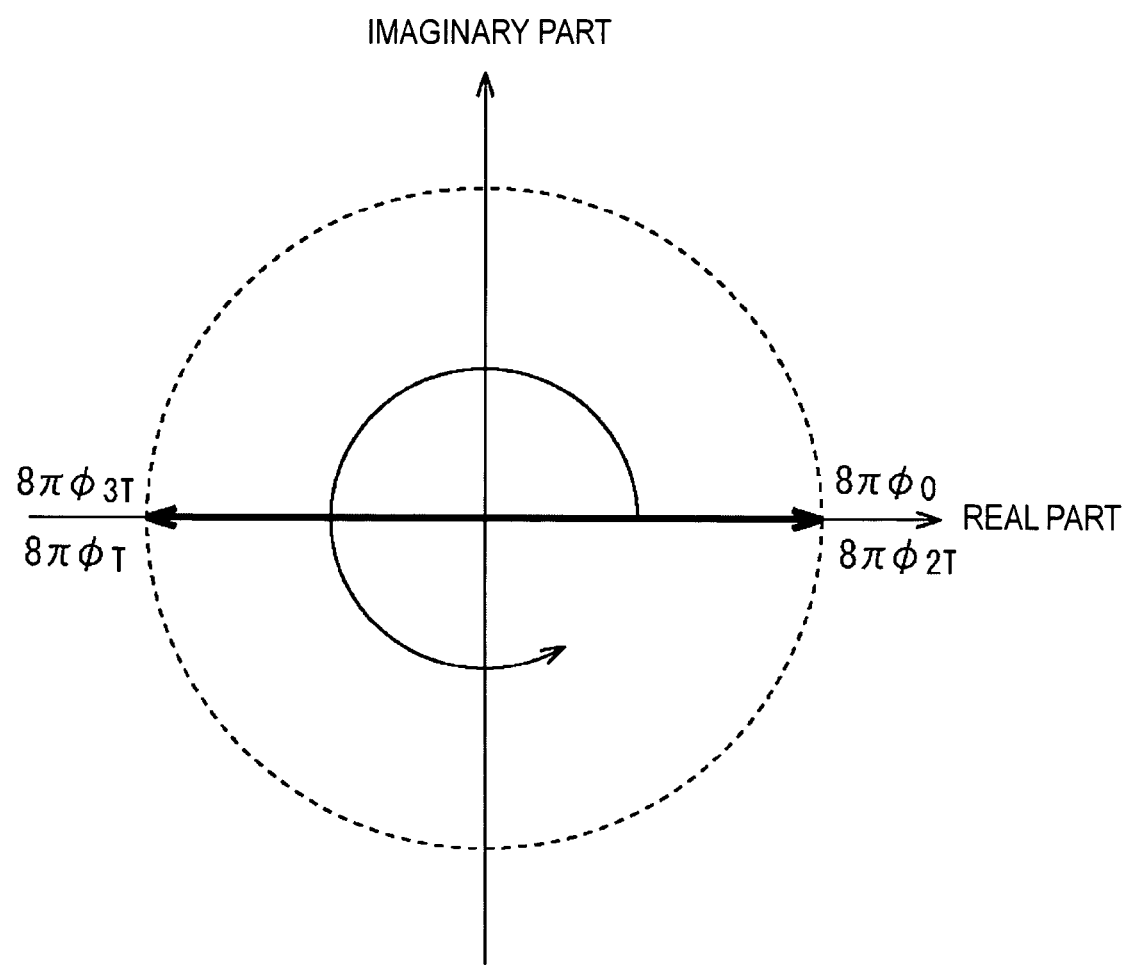
FIG. 8 is another diagram for explaining change in the phases of aliasing components.

Similarly, FIG. 6 shows the phases of second-order aliasing components, FIG. 7 shows the phases of third-order aliasing components, FIG. 8 shows the phases of fourth-order aliasing components, at time t=0, T, 2T, 3T, . . . .

As described above, k-th order aliasing components rotate at a regular interval (2πkφT) as time proceeds, i.e., as frames proceed, and returns to phase 0 at time t=(m/v)T. Furthermore, as the order of aliasing components increases, the interval of phase rotation is multiplied.

As described above, the phase of k-th (k=1, 2, . . . , (m−1)) order aliasing components generated by decimation (downsampling) by a decimation amount m rotates by 2πkφT. Thus, depending on the direction of the phase and the number of images that are integrated (i.e., the number of aliasing components that are combined), aliasing components cancel each other. That is, since φt depends on the moving velocity v and the decimation amount m, aliasing components cancel each other depending on the moving velocity v, the decimation amount m, and the number of images integrated.

Figure 9:
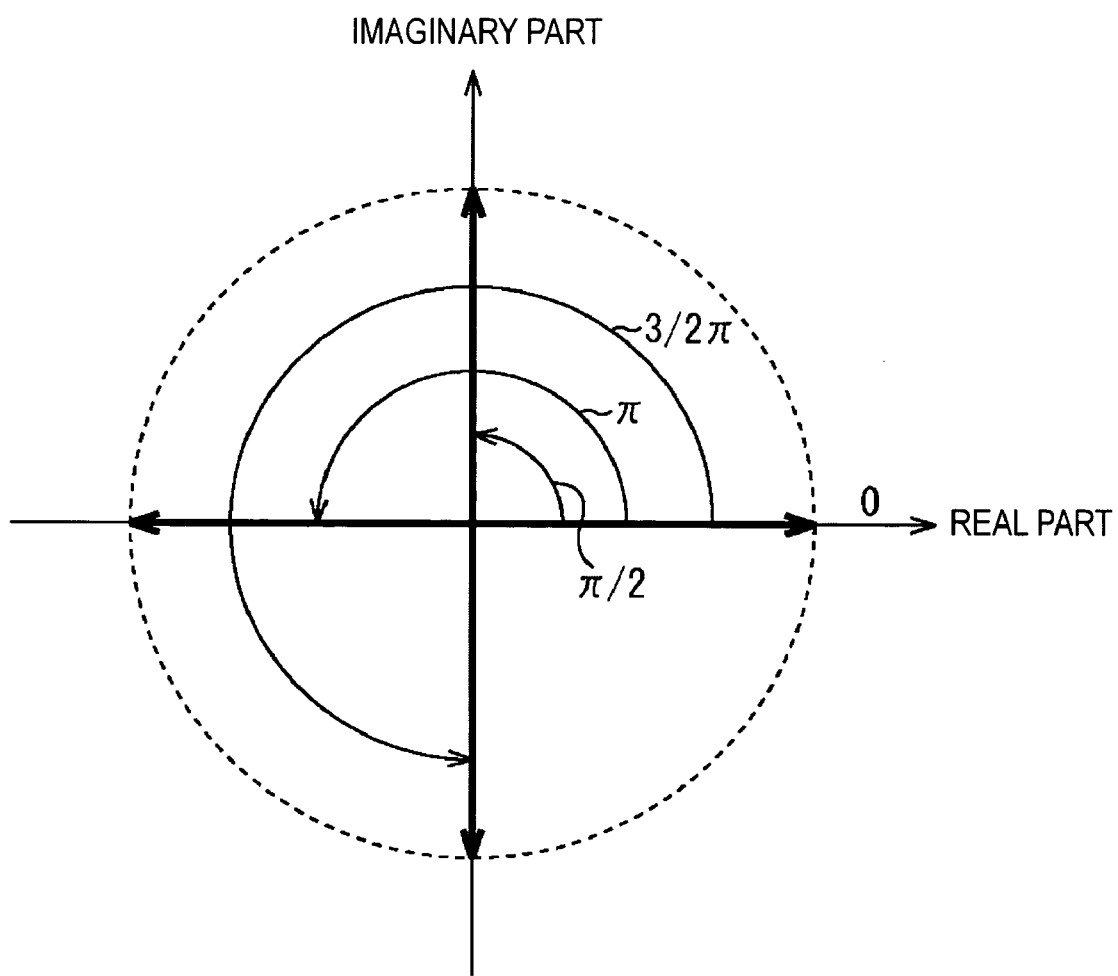
FIG. 9 is another diagram for explaining change in the phases of aliasing components.

For example, when v=1 and m=4, images of display frames Fb have first-order aliasing components whose phases vary at an interval of π/2 as 0(=2π×1×[1/4×0/T]), π/2(=2π×1×[1/4×T/T]), π(=2π×1×[1/4×2T/T]), 3π/2(=2π×1×[1/4×3T/T]), and so forth, as shown in FIG. 9.

In FIG. 9, and in FIGS. 10 and 11 described later, aliasing components at t=4t and later are not shown.

Figure 10:
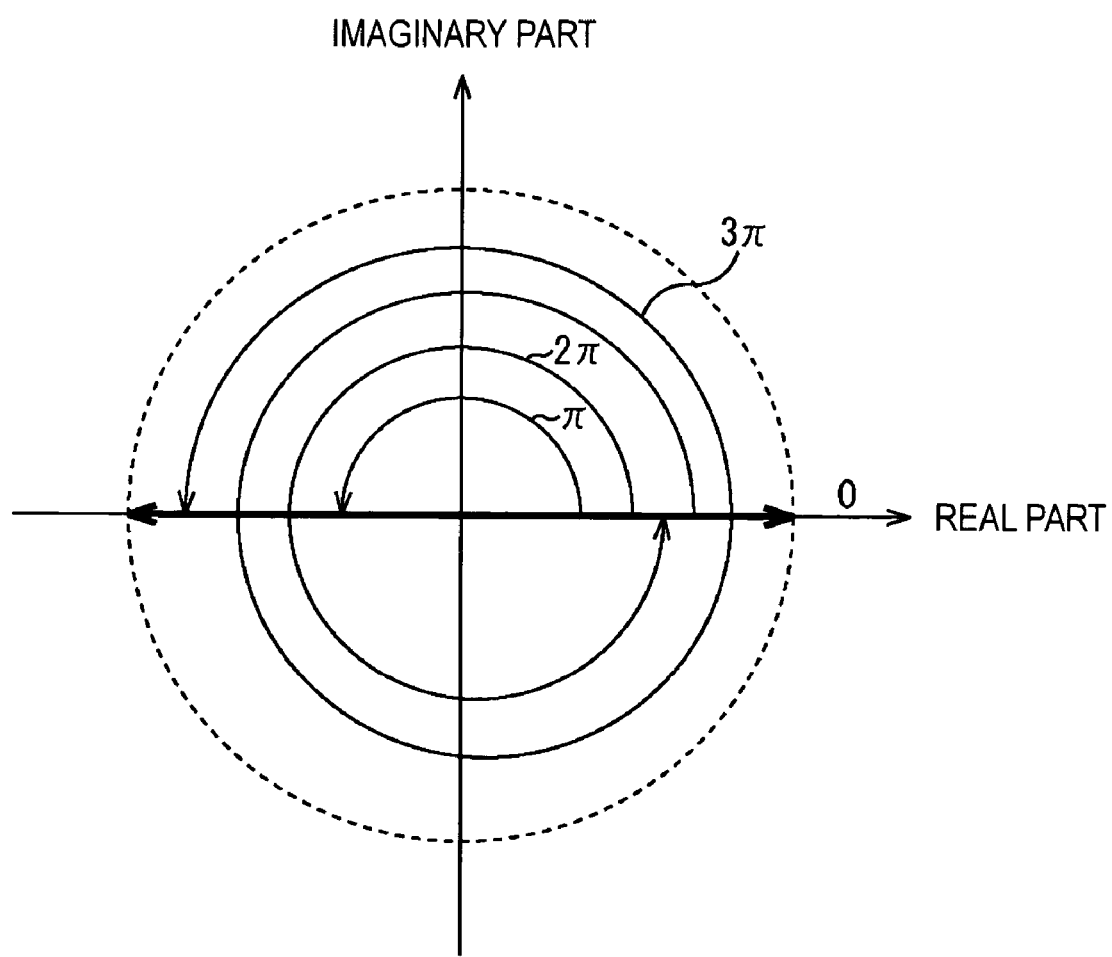
FIG. 10 is a diagram for explaining a rotation interval of the phases of aliasing components.

The images of the display frames Fb also have second-order aliasing components whose phases vary at an interval of π as 0(=2π×2×[1/4×0/T]), π(=2π×2×[1/4×T/T]), 2π(=2π×2×[1/4×2T/T]), 3π(=2π×2×[1/4×3T/T]), and so forth, as shown in FIG. 10. Furthermore, the images of the display frames Fb also have third-order aliasing components whose phases vary at an interval of 3π/2 as 0(=2π×3×[1/4×0/T]), 3π/2(=2π×3×[1/4×T/T]), 3π(=2π×3×[1/4×2T/T]), 9π/2(=2π×3×[1/4×3T/T]), and so forth, as shown in FIG. 11.

Figure 11:
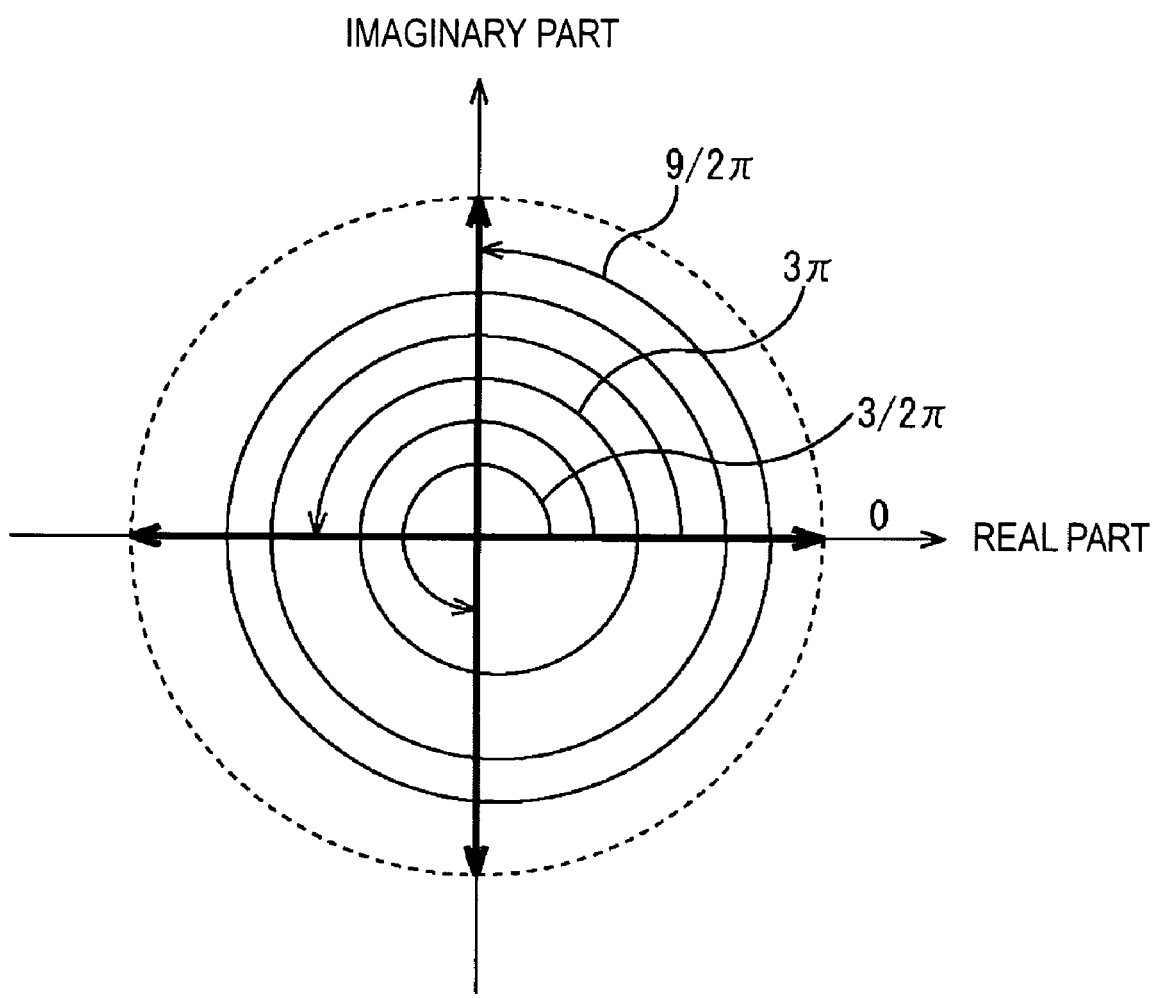
FIG. 11 is another diagram for explaining a rotation interval of the phases of aliasing components.

In this case, the vectors of the first-order to third-order aliasing components at t=0, T, 2T, 3T are directed so as to cancel each other, as shown in FIGS. 9 to 11. Thus, all the aliasing components are canceled when the four display frames Fb are integrated by the vision.

The condition for k-th order aliasing components to be canceled can be expressed by expression (5). Expanding equation (5) by Euler's formula yields expressions (6) and (7).

$$\sum_t e^{j2\pi k\phi_t} = 0 \qquad (5)$$

$$\sum_t \cos(2\pi k\phi_t) = 0 \qquad (6)$$

$$\sum_t \sin(2\pi k\phi_t) = 0 \qquad (7)$$

That is, in this embodiment, the decimation amount m is determined in accordance with the moving velocity v of the object image Wa so that aliasing components cancel each other, thereby removing aliasing components.

Figure 12:
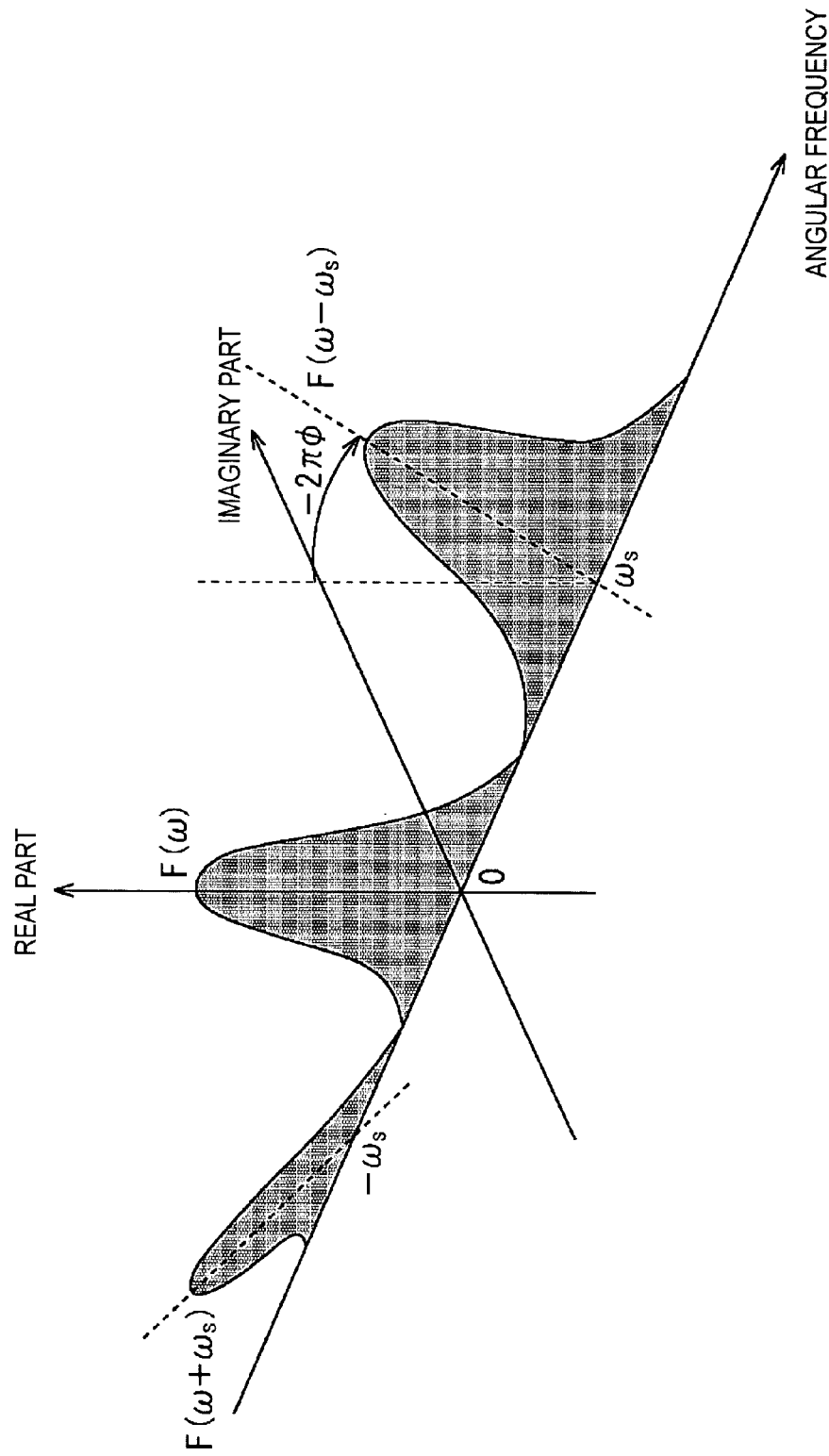
FIG. 12 is another diagram for explaining aliasing components.

Considering a case where the sampling signal $fs\phi(x)$ is reduced to 1/m by a band-limiting digital filter, the original signal f(x) as shifted by $\phi$ is limited within the Nyquist frequency so that aliasing does not occur. For example, when m=2, the Fourier space is as shown in FIG. 12, and frame images corresponding to the signals reduced to 1/m are low-resolution images not including aliasing components.

In this case, the fundamental wave of the reduced signal is different from the original signal, so that it is not possible to represent frequency components above the Nyquist frequency however the plurality of frame images are summed, so that it is not possible to achieve the super-resolution effect.

Therefore, in order to achieve the super-resolution effect, it is important not to limit the bandwidth of the original signal, and it is optimal to decimate an original image having a wide band of spatial frequency components.

Although description has been made above in the context of a first-order original signal for simplicity, the same applies to two-dimensional images.

Furthermore, although the description has been made in the context of movement of the object Wa with respect to the X-axis direction with reference to FIG. 2, the same applies to movement with respect to the Y-axis direction.

Next, the condition for aliasing components to be canceled with each other, i.e., the condition for achieving the super-resolution effect, will be described.

Figure 13:
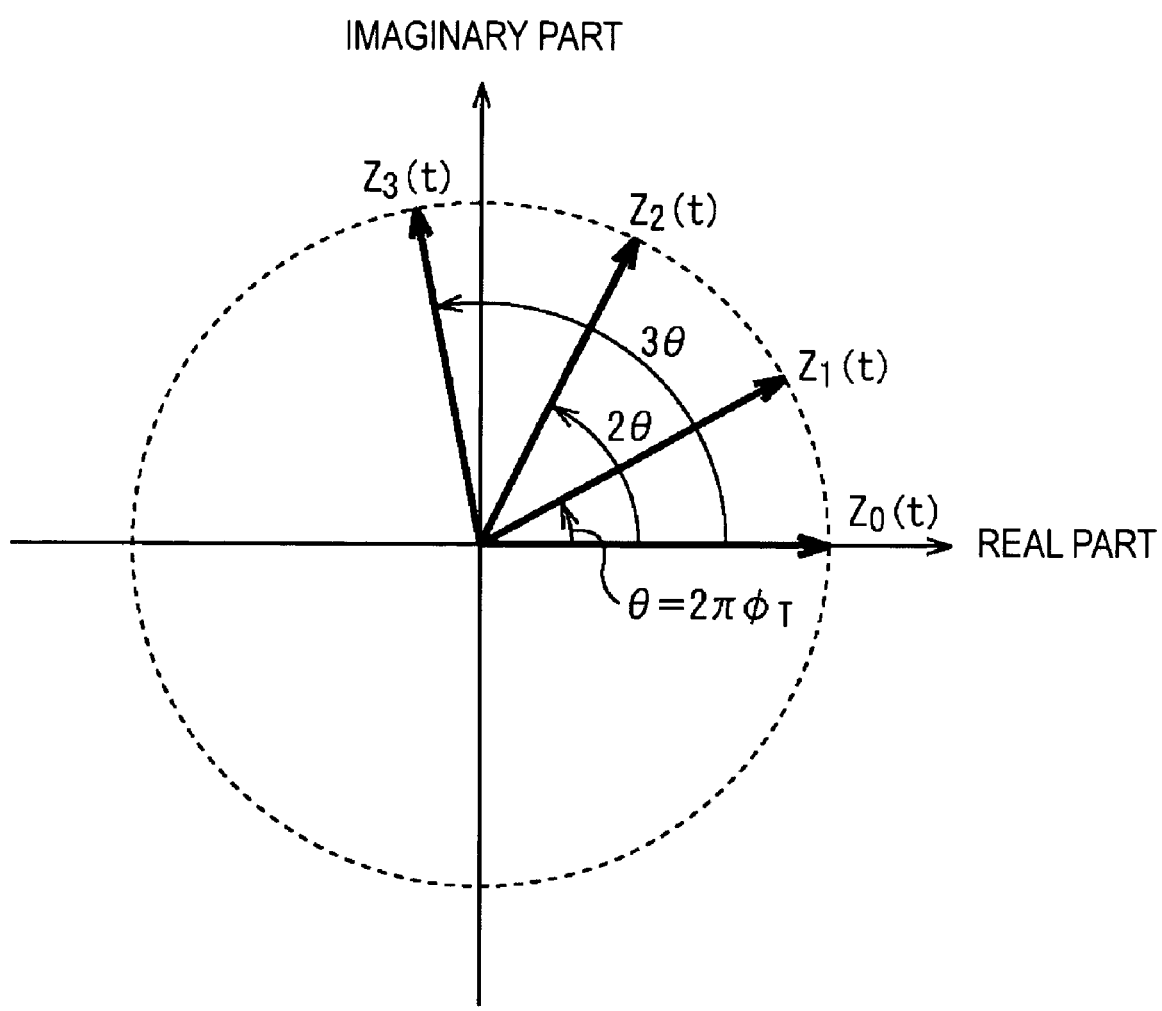
FIG. 13 is another diagram for explaining a rotation interval of the phases of aliasing components.

The condition for achieving the super-resolution effect is that expression (5) is satisfied, i.e., that expressions (6) and (7) are satisfied. That is, the sum of vectors $Z_k(t)$ in an integration period of the vision must be zero, where the vectors $Z_k(t)$ denote k-th order aliasing components at time t, as shown in FIG. 13.

Whether the condition is satisfied depends on the integration period. However, it is difficult to determine a range of integration period in which the condition is satisfied, since the integration period is known to vary depending on observation environment and it is difficult to measure the integration period accurately.

It has been found out that when the frame rate is high, i.e., when the number of images that are integrated is large, the super-resolution effect is achieved even if the decimation amount m is large. This has been found out by an experiment in which an object image Wa that moves, for example, in the X-axis direction or the Y-axis direction at a predetermined moving velocity v is sampled by a predetermined decimation amount m and a resulting display object image Wb is displayed at a predetermined frame rate, checking whether the image is actually observed by an observer at a super-resolution.

The condition for the super-resolution effect to be achieved depends on the moving velocity v, and can be expressed approximately by expression (8).

$$2\pi n + \alpha \leq 2\pi k\phi T \leq 2\pi(n+1) - \alpha \quad (8)$$

As described earlier, the phases of aliasing components rotate at an interval of $2\pi k\phi T$. Expression (8) indicates that the super-resolution effect is achieved when the phase rotation interval of the aliasing components is close to a multiple of $2\pi$.

Figure 14:
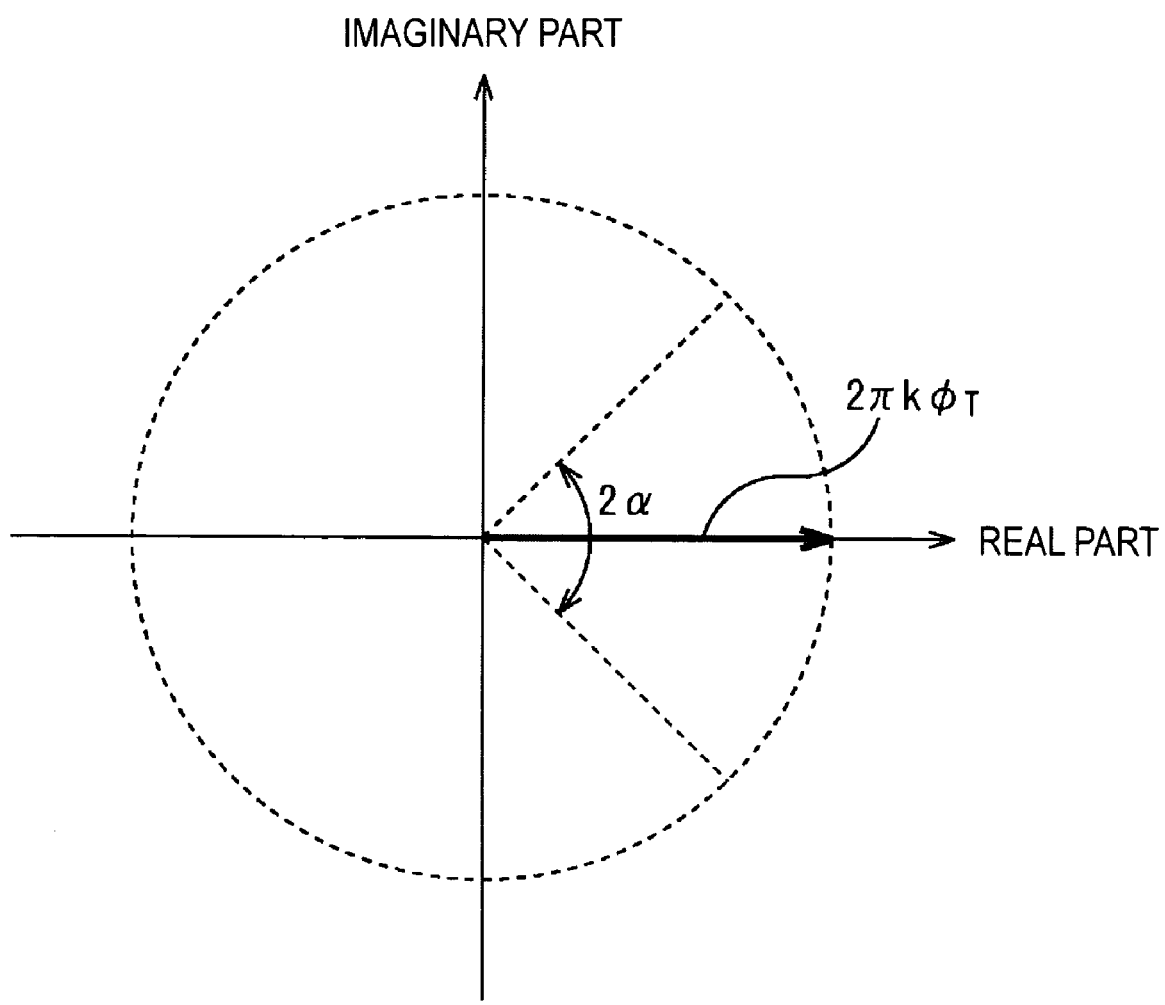
FIG. 14 is a diagram for explaining phases of aliasing components with which the super-resolution effect is achieved.

As shown in FIG. 14, when the phase rotation interval is close to a multiple of $2\pi$, the phases of aliasing components do not substantially change even when time t changes, and the aliasing components are maintained without being canceled.

Figure 15:
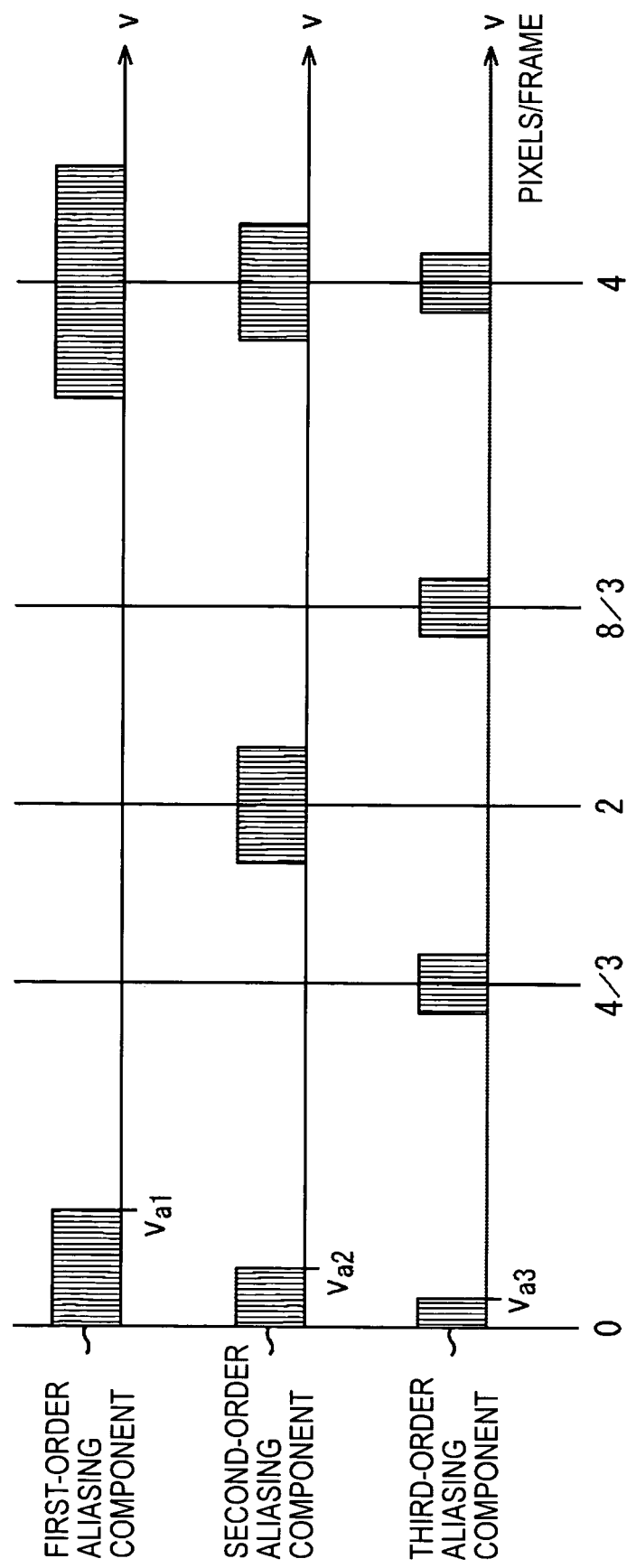
FIG. 15 is a diagram showing velocity ranges in which the super-resolution effect is not achieved.

For example, considering the condition for satisfying expression (8) with regard to first-order to third-order aliasing components that are generated with m=4, expression (8) is not satisfied in a shaded range of the moving velocity v (pixels/frame) in FIG. 15, so that the super-resolution effect is not achieved in that range.

With regard to the first-order aliasing components, for example, when v=4, the phase rotation interval of the aliasing components is $2\pi \times 1 \times (4/4)$ ($2\pi k\phi T$), so that the phase rotation interval of aliasing components is $2\pi \times 1$. Thus, the first-order aliasing components are not canceled in a certain range centered at the velocity v=4 (velocity ranges in which the phase rotation interval is in a range of $2\alpha$ centered at a multiple of $2\pi$). That is, when v=4n (n=0, 1, 2, 3, ...), the phase rotation interval is $2\pi \times n$, so that the first-order aliasing components are not canceled in a certain range centered at v=4n.

With regard to the second-order aliasing components, for example, when v=2, the phase rotation interval is $2\pi \times 2 \times (2/4)$, i.e., $2\pi \times 1$, and when v=4, the phase rotation interval is $2\pi \times 2 \times (4/4)$, i.e., $2\pi \times 2$. Thus, the second-order aliasing components are not canceled in certain ranges centered at the velocity v=2, 4 (velocity ranges in which the phase rotation interval is in a range of $2\alpha$ centered at a multiple of $2\pi$). That is, when v=2n, the phase rotation interval is $2\pi \times n$, so that the second-order aliasing components are not canceled in a certain range centered at v=2n.

With regard to the third-order aliasing components, for example, when v=4/3, the phase rotation interval is $2\pi \times 3 \times (4/3)/4$, i.e., $2\pi \times 1$, when v=8/3, the phase rotation interval is $2\pi \times 3 \times (8/3)/4$, i.e., $2\pi 33\ 2$, and when v=4, the phase rotation interval is $2\pi \times 3 \times 4/4$, i.e., $2\pi \times 3$. Thus, the third-order aliasing components are not canceled in certain ranges centered at the velocity v=4/3, 8/3, 4 (velocity ranges in which the phase rotation interval is in a range of $2\alpha$ centered at a multiple of $2\pi$). That is, when v=(4/3)n, the phase rotation interval is $2\pi \times n$, so that the third-order aliasing components are not canceled in a certain range centered at v=(4/3)n.

When the velocity v=0, the phase rotation interval $2\pi k\phi T=0$, so that the first-order to third-order aliasing components are not canceled in certain ranges in the proximity of v=0 (0 to v$\alpha$1, 0 to v$\alpha$2, and 0 to v$\alpha$3).

Also, the first-order and second-order aliasing components that occur with m=3 (FIG. 16) and the first-order aliasing component that occurs with m=2 (FIG. 17) are not canceled in velocity ranges in which the phase rotation interval is in a range of $2\alpha$ centered at a multiple of $2\pi$, similarly to the case of m=4 described above.

Furthermore, as shown in FIG. 13, the phase rotation interval is doubled, tripled, and increased to further multiples as the order of aliasing components increases.

Letting the phase rotation interval be denoted as $\theta$, when the moving velocity v of the object image Wa is low and the phase rotation interval $\theta$ is smaller than $\alpha$, expression (8) is not satisfied, so that the super-resolution effect is not achieved. When the moving velocity v of the object image Wa increases and the phase rotation interval $\theta$ reaches $\alpha$, the super-resolution effect is achieved.

This indicates that $\alpha$ is a critical point (phase rotation interval) of achieving the super-resolution effect. $\alpha$ varies depending on the display image frame rate, and it tends to decrease as the display frame rate increases.

Let the moving velocity of the object Wa at the critical point be denoted as v$\alpha$, expression (9) is derived, and rearranging expression (9) yields expression (10).

$$\alpha = 2\pi k \frac{v_a}{m} \quad (9)$$

$$v_a = \frac{\alpha}{2\pi} \frac{m}{k} \quad (10)$$

Thus, when the display image frame rate increases and α decreases, the velocity vα (vα1, vα2, and vα3 in the example shown in FIG. 15) becomes lower, so that the super-resolution effect is achieved even when the movement amount is small.

As will be understood from expression (10), vα at the critical point depends on the decimation amount m and the order k of aliasing components. The velocity va at the critical point increases as the decimation amount m increases. Furthermore, the velocity vα at the critical point decreases as the order k increases. In the example shown in FIG. 15, vα2 is smaller than vα1, and vα3 is smaller than vα2. Thus, it is understood that the region where the super-resolution effect by high-order aliasing components is not achieved is narrow.

The super-resolution effect of the vision can be summarized as follows.

The critical point α for achieving the super-resolution effect becomes smaller as frame rate increases.

When the decimation amount is m, first-order to (m−1)-th-order aliasing components must satisfy expression (8).

When the decimation amount m decreases, the velocity vα of the object image Wa at the critical point becomes lower. That is, when the decimation amount m is small, the super-resolution effect is achieved even if the movement amount is small.

From what has been described above, it is understood that the super-resolution effect can be achieved by carrying out decimation in accordance with the moving velocity (magnitude and direction) of an object.

It is advantageous to increase the display image frame rate in order to achieve the super-resolution effect, and also advantageous, for example, in order to suppress degradation in image quality, e.g., motion blur or jerkiness.

Now, the construction of a moving-image converting device 1A according to an embodiment of the present invention will be described with reference to FIG. 18A. The moving-image converting device 1A is capable of converting a captured image into an image having an output resolution so that degradation in image quality due to the conversion to the output resolution will not be perceived by an observer, using the resolution conversion based on the super-resolution effect described above.

An imaging unit 11A includes a solid-state imaging device, such as a CCD imaging device or a CMOS imaging device, that is capable of imaging at a resolution higher than a resolution of an image that can be output by an output unit 13A.

The imaging unit 11A captures moving images at a predetermined frame rate and a predetermined spatial sampling rate (hereinafter simply referred to as a sampling rate), and converts the images captured into an internal data format. For example, when the frame rate of an image that can be output by the output unit 13A is F, and the resolution thereof is x×y pixels, imaging is carried out at the frame rate F and a resolution of ix×iy pixels, and images captured is converted into imaged frames Fa in the internal data format. i, j, x, and y are positive numbers.

The imaging unit 11A supplies the imaged frame Fa (ix×jy pixels) to an image converter 12.

When image signals output from the solid-state imaging device are analog signals, the imaging unit 11A converts the analog signals into digital signals in the internal data format by an analog-to-digital converter that is not shown.

Since it is easier to achieve the super-resolution effect with a higher frame rate, the imaging unit 11A is adapted to be capable of operation at a high frame rate. As for the solid-state imaging device, since a CMOS imaging device is more suitable for imaging at a high frame rate, the imaging unit 11A includes a CMOS imaging device in this embodiment.

The image converter 12 converts the imaged frames Fa (ix×jy pixels) supplied from the imaging unit 11A or an image input unit 11B into output frames Fb (x×y pixels) of a resolution that can be output by the output unit 13A.

At this time, the image converter 12 carries out the resolution conversion based on the super-resolution effect described earlier, by blocks each having a predetermined size. Thus, the super-resolution effect, i.e., the visual effect that an observer perceives output frames Fb displayed at a predetermined frame rate at a super-resolution exceeding the resolution of the output frames Fb, is achieved.

The image converter 12 supplies the output frames Fb to the output unit 13A.

The output unit 13A outputs moving-image signals. Since it is easier to achieve the super-resolution effect with a higher frame rate as described earlier, the output unit 13A is adapted to be capable of outputting images at a high frame rate.

Next, an image display device 1B according to an embodiment of the present invention will be described with reference to FIG. 18B.

An image input unit 11B receives input of an image having a predetermined frame rate and a predetermined spatial sampling rate (hereinafter simply referred to as a sampling rate), and converts the image into an internal data format. For example, when the frame rate of a display device of an image display unit 13B is F and the display resolution is x×y pixels, an image having a frame rate F and a resolution of ix×jy pixels is input and the image is converted into input frames Fa in the internal data format. i, j, x, and y are positive numbers. The image input unit 11B supplies the input frames Fa (ix×jy pixels) to an image converter 12.

The image input unit 11B, when analog signals are input thereto, converts the analog signals into digital signals in the internal data format by an internal analog-to-digital converter (not shown).

The image input unit 11B is also capable of handing image signals such as television signals standardized by SMPTE (Society of Motion Picture and Television Engineers), analog video signals standardized by VESA (Video Electronics Standards Association), or DVI (Digital Visual Interface) signals standardized by DDWG (Digital Display Working Group).

Furthermore, since it is easier to achieve the super-resolution effect with a higher frame rate as described earlier, when the frame rate of input frames Fa is high, the image input unit 11B is adapted to be capable of operation at a high frame rate.

The image converter 12 is constructed the same as the image converter 12 in the moving-image converting device 1A, and it supplies display frames Fb to the image display unit 13B.

The image display unit 13B is implemented by a display device having x×y pixels. The image display unit 13B displays an image supplied from the image converter 12 at a predetermined frame rate. Since it is easier to achieve the super-resolution effect with a higher frame rate as described earlier, the image display unit 13B is adapted to be capable of displaying an image at a high frame rate.

Next, the construction of the image converter 12 will be described.

The image converter 12 receives input of image signals in the internal data format, composed of ix×jy pixels.

A movement-amount detector 21 of the image converter 12 carries out block matching between a current imaged frame Fa that is currently supplied from the imaging unit 11A or the image input unit 11B and a previous imaged frame Fa that is input one frame period before or some frame periods before, thereby detecting motion vectors of block images (ip×jq pixels) of the current frame Fa. p and q are both positive integers. In this case, the total number of blocks of the imaged frame Fa is x/p×y/q.

The movement-amount detector 21 supplies the imaged frames Fa block by block to a resolution converter 22, together with the motion vectors detected.

Th resolution converter 22 applies filtering or sampling (i.e., decimation) with respect to the X-axis direction and the Y-axis direction on the block images (ip×jq pixels) of the imaged frames Fa supplied from the movement-amount detector 21, in accordance with a movement amount v (pixels) or the moving velocity v (pixels/frame) of each of the frames with respect to the X-axis direction and the Y-axis direction as determined from the motion vectors.

The resolution converter 22 collects the same number of block images (p×q pixels) of resulting output frames Fb as the number of the total blocks (x/p×y/q pixels), generating a single output frame Fb (x×y pixels), and outputs the output frame Fb to the output unit 13A or the image display unit 13B.

Figure 19:
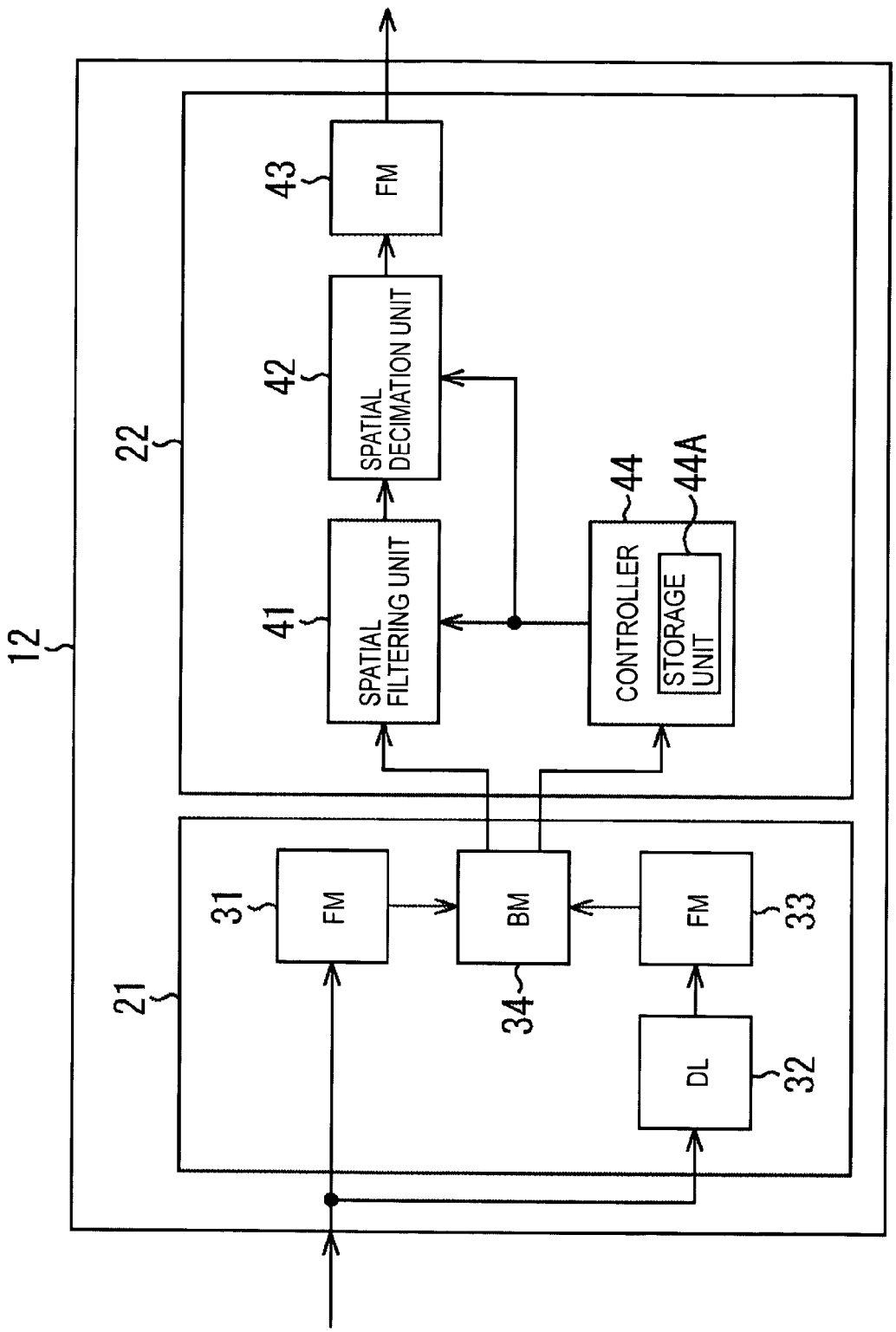
FIG. 19 is a block diagram showing example constructions of a movement-amount detector and a resolution converter shown in FIGS. 18A and 18B.

Next, the movement-amount detector 21 and the resolution converter 22 of the image converter 12 will be described with reference to FIG. 19.

A frame memory 31 of the movement-amount detector 21 stores an imaged frame Fa (a current imaged frame Fa) received from the imaging unit 11A or the image input unit 11B.

A delaying circuit 32 delays a previous frame Fa that is input before the current frame Fa by one frame period or some frame periods so that the phase of the previous frame matches the phase of the current frame Fa. The delaying circuit 32 supplies the delayed previous frame Fa to a frame memory 33.

The frame memory 33 stores the previous frame Fa supplied from the delaying circuit 32.

A block matching circuit 34 carries out block matching, for each block composed of ip×jq pixels, between the current frame Fa stored in the frame memory 31 and the previous frame Fa stored in the frame memory 33, thereby detecting motion vectors of block images (ip×jq pixels) of the current frame Fa. The block matching circuit 34 supplies the block images of the current frame Fa to a spatial filtering unit 41 of the resolution converter 22, and supplies the motion vectors of the block images to a controller 44 of the resolution converter 22.

The above-described construction of the movement-amount detector 21 is only an example, and other constructions may be employed as long as it is possible to detect a motion vector of each block of an imaged frame Fa.

Figure 20:
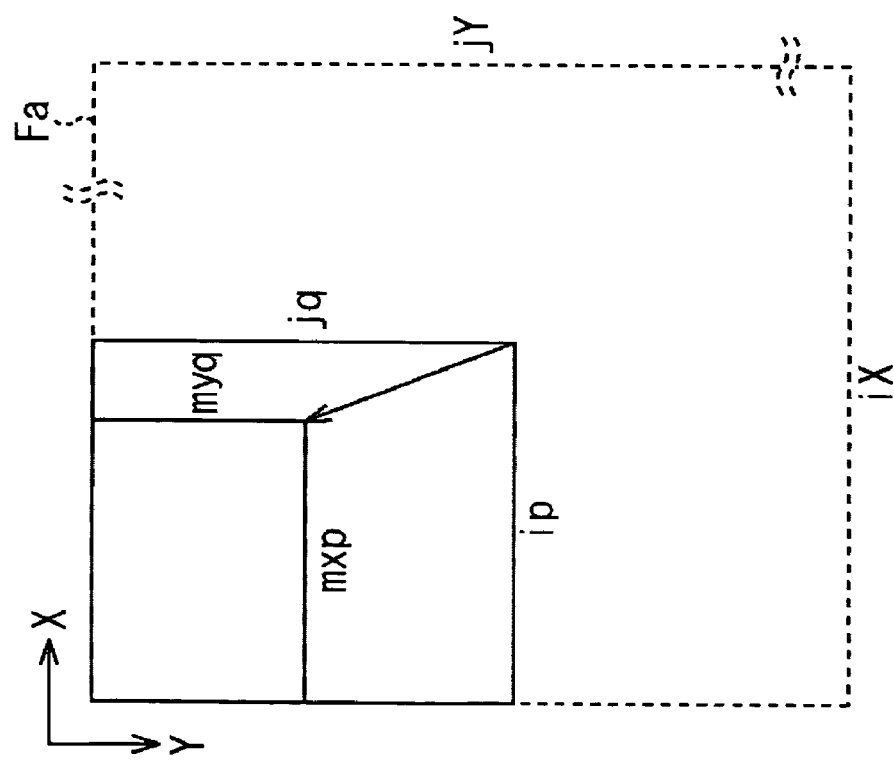
FIG. 20 is a diagram for explaining an operation of the resolution converter shown in FIGS. 18A and 18B.

The spatial filtering unit 41 of the resolution converter 22 receives input of the block images (ip×jq pixels) of the imaged frame Fa from the block matching circuit 34 of the movement-amount detector 21 (refer to the left part of FIG. 20). The spatial filtering unit 41 is a digital filter for limiting the bandwidth of spatial resolution. The spatial filtering unit 41 suppresses aliasing components to achieve a desired resolution given by the controller 44.

More specifically, the spatial filtering unit 41, under the control of the controller 44, spatially filters the block images (ip×jq pixels) of the imaged frame Fa so that block images (p×q pixels) of an output frame Fb is obtained by decimation by decimation amounts mx and my in the spatial decimation unit 42 at a subsequent stage, obtaining an image having mxp×myp pixels (refer to the left part of FIG. 20).

The spatial filtering unit 41 supplies the image having mxp×myq pixels to the spatial decimation unit 42. mx and my are both positive integers.

The spatial filtering unit 42 does not limit the bandwidth of spatial resolution, but it decimates the original image to convert the original image into an image having a desired resolution given by the controller 44.

More specifically, images supplied from the spatial filtering unit 41, having mxp×myq pixels (refer to the right part of FIG. 20), are decimated with respect to the X-axis direction and the Y-axis direction by a decimation amount mx with respect to the X-axis direction and by a decimation amount my with respect to the Y-axis direction, the decimation amounts mx and my being given by the controller 44, thereby generating images having p×q pixels, i.e., block images of an output frame Fb (refer to the right part of FIG. 20). The spatial decimation unit 42 supplies the images having p×q pixels to a frame memory 43.

When mx<i and my<j as in the example shown in FIG. 20, the decimation amounts are mx and my given by the controller 44. When mx>i and my>j, the decimation amounts are i and j.

Referring back to FIG. 19, the frame memory 43 stores the block images supplied from the spatial decimation unit 42, having p×q pixels, and generates a single output frame Fb having x×y pixels.

The controller 44 receives input of the motion vectors of the block images from the movement-amount detector 21. The controller 44, based on a moving velocity v with respect to the X-axis direction and the Y-axis direction, determines maximum decimation amounts mx and my with which the phase rotation interval of aliasing components satisfies expression (8). That is, the controller 44 determines decimation amounts that satisfy the condition for achieving the super-resolution effect.

Since $\alpha$ in expression (8) varies depending on the number of images that are integrated by the vision in an integration period as described earlier, it is difficult to determine the value of $\alpha$ suitably.

Thus, in this embodiment, an experiment is carried out in advance in which, for example, an object image Wa moving at a predetermined moving velocity v in the X-axis direction or the Y-axis direction is sampled by a predetermined decimation amount m, and it is checked whether a resulting display object image Wb can be actually perceived by an observer at a super-resolution. The decimation amount m is determined based on the relationship between moving velocity v and decimation amount m with which the super-resolution effect is achieved in the experiment.

Figure 21:
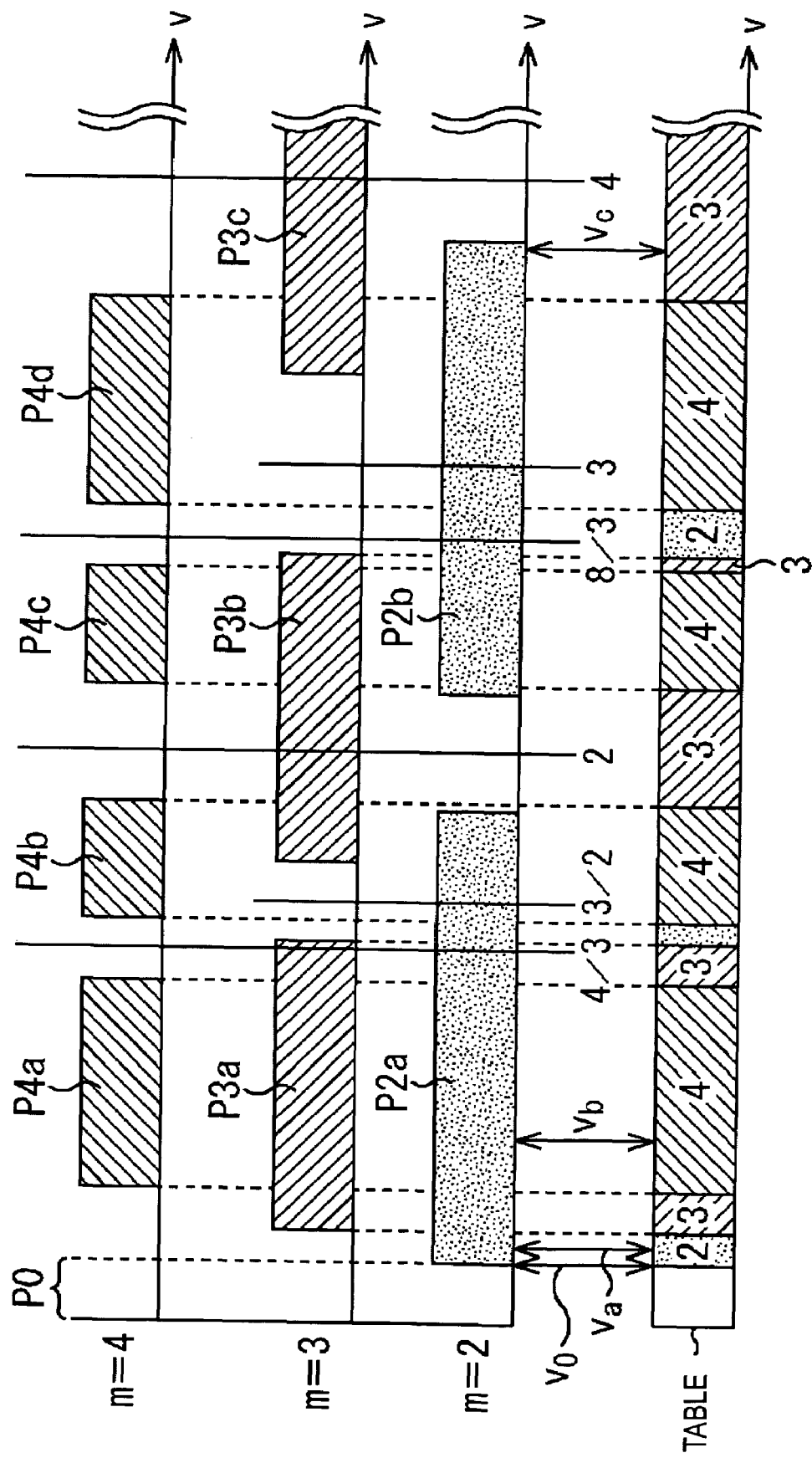
FIG. 21 is a diagram showing relationship between moving velocity and decimation amount of images in cases where the super-resolution effect is achieved.

FIG. 21 shows results of the above-described experiment carried out with an object image Wa that moves horizontally.

FIG. 21 shows that the super-resolution effect is not achieved in certain ranges of moving velocity centered at velocity v=4/3, 2, 8/3, 4 with decimation amount m=4, in certain ranges of moving velocity centered at velocity v=3/2, 3 with decimation amount m=3, and in certain ranges of moving velocity centered at velocity v=2, 4 with decimation amount m=2.

FIG. 21 also shows that when the moving velocity v is in a predetermined range P0 from 0 as a starting point (i.e., when the velocity v is not over a velocity v0 shown in FIG. 21), the super-resolution effect is not achieved with m=2, 3, 4.

Figure 16:
FIG. 16 is another diagram showing velocity ranges in which the super-resolution effect is not achieved.
Figure 17:
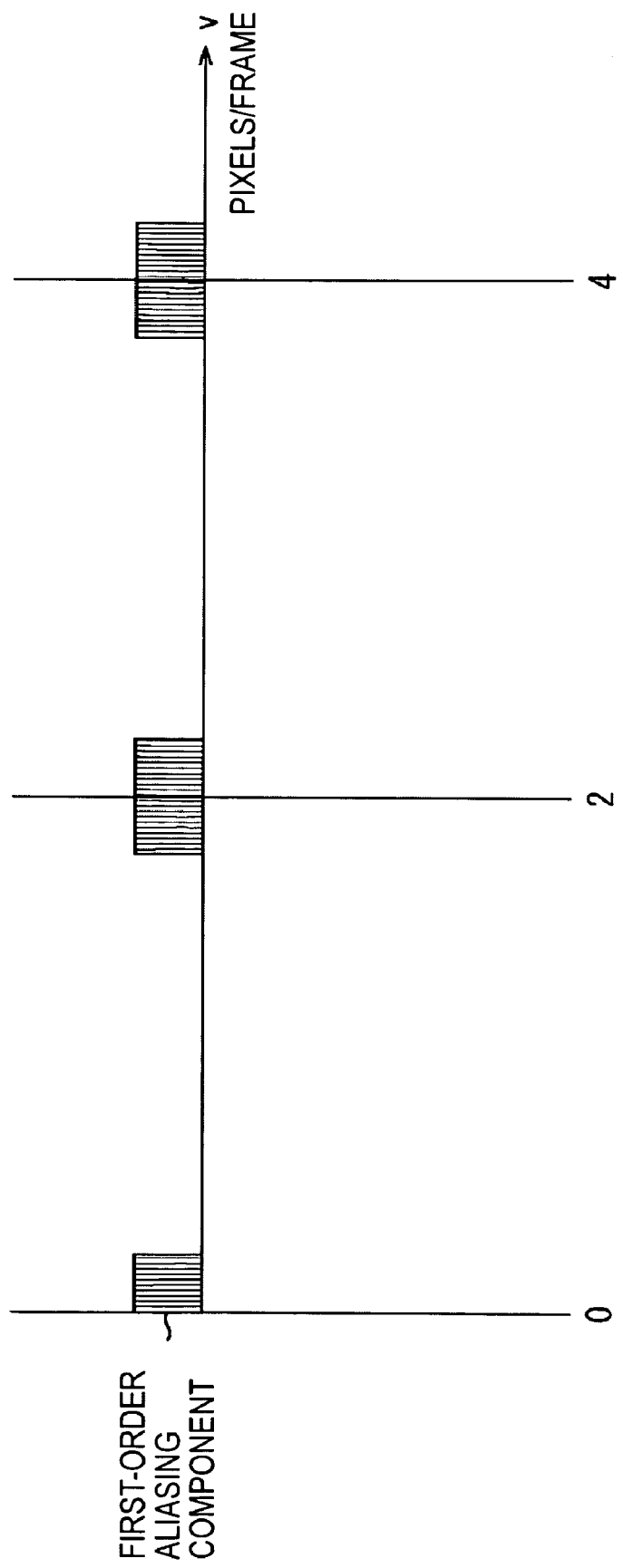
FIG. 17 is another diagram showing velocity ranges in which the super-resolution effect is not achieved.

This corresponds to the range of moving velocity v in which expression (8) is not satisfied, described with reference to FIGS. 15 to 17.

Figure 22:
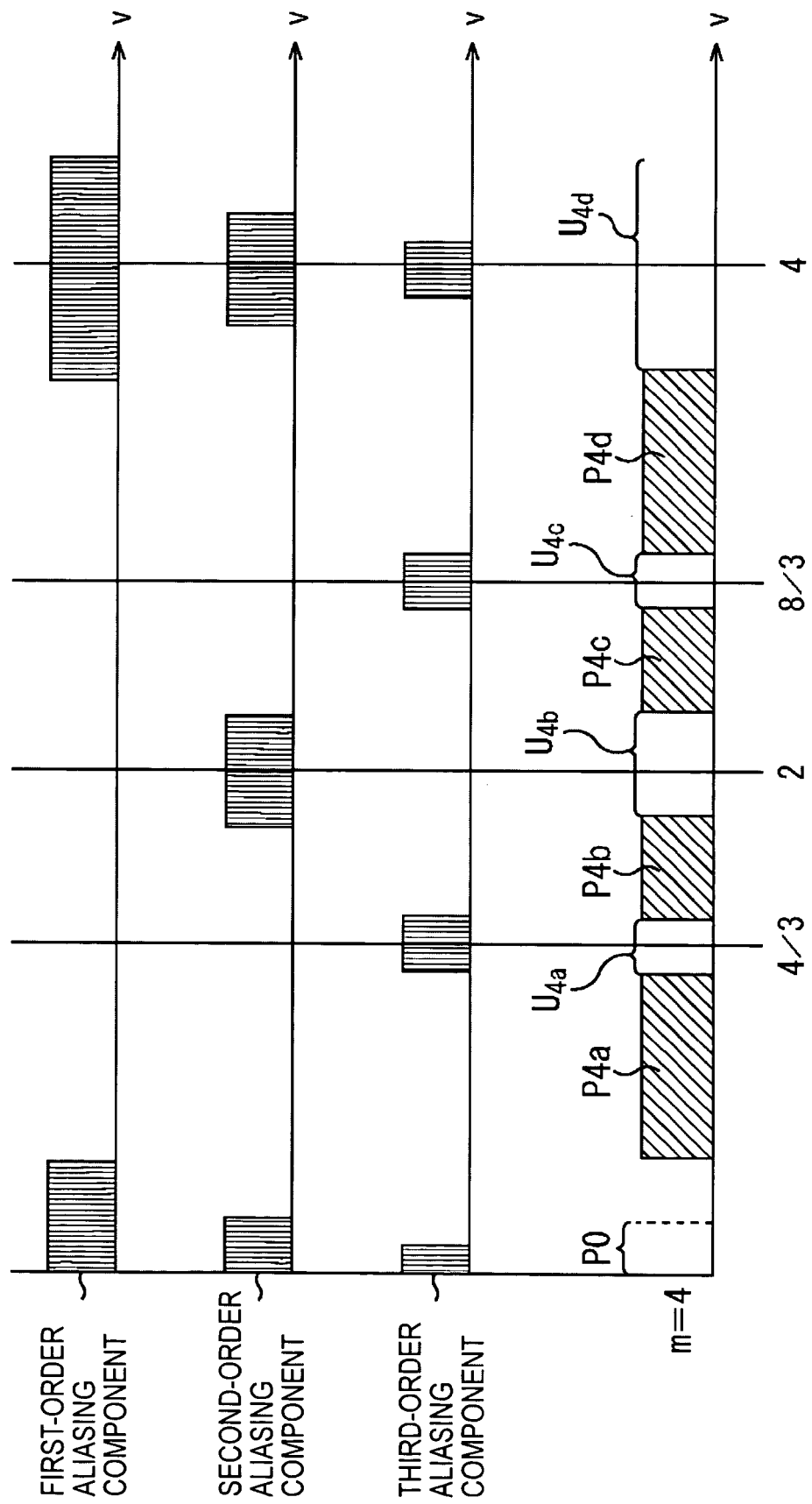
FIG. 22 is another diagram showing relationship between moving velocity and decimation amount of images in cases where the super-resolution effect is achieved.

For example, FIG. 22 shows the region of m=4 in FIG. 21 correspondingly to FIG. 15. The first-order aliasing components are not canceled in certain ranges centered at v=4n. The second-order aliasing components are not canceled in certain ranges centered at v=2n. The third-order aliasing components are not canceled in certain ranges centered at v=(4/3)n. Furthermore, the first-order to third-order aliasing components are not canceled in certain ranges in the proximity of v=0.

That is, when even one of the first-order to third-order aliasing components is not canceled, the super-resolution effect is not achieved with decimation by m=4 in the range of moving velocity v.

FIG. 22 shows such ranges where the super-resolution effect is not achieved as ranges U4a to U4d. Furthermore, FIG. 22 shows ranges where the super-resolution effect is achieved with m=4 as ranges P4a to P4d.

FIG. 21 also shows ranges where the super-resolution effect is achieved with m=4 as ranges P4a to P4d. Similarly, FIG. 21 shows ranges where the super-resolution effect is achieved with m=3 as ranges P3a to P3c, and ranges where the super-resolution effect is achieved with m=2 as ranges P2a and P2b.

Thus, in this example, for example, when the moving velocity v of a block image of the imaged frame Fa with respect to the X-axis direction is a velocity va in a range of 0 to 4/3 shown in FIG. 21, the decimation amount is chosen to be 2 pixels so that the super-resolution effect will be achieved, and the block image is decimated by the decimation amount of 2 with respect to the X-axis direction.

As another example, when the moving velocity v of a block image of the imaged frame Fa with respect to the X-axis direction is a velocity vb in the range of 0 to 4/3, the velocity vb being faster than the velocity va, the decimation amount is chosen to be 4, which is maximum among m=2, 3, 4 with which the super-resolution effect is achieved. The block image is accordingly decimated by the decimation amount of 4 with respect to the X-axis direction.

When the moving velocity v of a block image of the imaged frame Fa with respect to the X-axis direction is within the range P0, i.e., when the super-resolution effect is not achieved with the velocity v, the decimation amount m is chosen to be 1, so that resolution conversion is all up to spatial filtering.

That is, in this embodiment, with regard to a region where the moving velocity v of the object image Wa is high, decimation is carried out so as not to remove aliasing components, where the super-resolution effect is achieved. On the other hand, with regard to a region where the moving velocity v is small, i.e., in the range P0, where the super-resolution effect is not achieved, the bandwidth is limited by spatial filtering so as not to cause aliasing.

Furthermore, when the frame rate is high, the range where the super-resolution effect is not achieved becomes smaller, i.e., the range where the super-resolution effect is achieved becomes larger, so that decimation by a larger decimation amount is allowed.

The choice of the decimation amount can be summarized as a table shown in FIG. 21. That is, the controller 44 determines a decimation amount with respect to the X-axis direction based on the table shown in FIG. 21, and a decimation amount with respect to the Y-axis direction based on a similar table.

The controller 44, for example, stores the table shown in FIG. 21 in a storage unit 44A, and detects decimation amounts m (mx and my) associated with the moving velocity v in the table.

The controller 44 controls the spatial filtering unit 41 to convert block images (ip×jq pixels) of the imaged frame Fa into images having mxp×myq pixels, thereby carrying out decimation by spatial filtering so that the bandwidth will be limited. Furthermore, the controller 44 controls the spatial decimation unit 42 to decimate the images supplied from the spatial filtering unit 41, having mxp×myq pixels, by decimation amounts mx and my without limiting bandwidth.

When the moving velocity v is in the range P0, the super-resolution effect is not achieved with m=2, 3, 4, so that the controller 44 chooses a decimation amount of 1 so that resolution conversion is all up to filtering by the spatial filtering unit 41.

Next, an operation of the image converter 12 will be described with reference to a flowchart shown in FIG. 23.

In step S1, the block matching circuit 34 of the movement-amount detector 21 of the image converter 12 initializes the block number (e.g., to 1). In step S2, the block matching circuit 34 determines whether motion vectors have been detected for all the blocks of the imaged frame Fa.

If it is determined in step S2 that motion vectors have not been detected for all the blocks, the procedure proceeds to step S3. In step S3, the block matching circuit 34 of the movement-amount detector 21 carries out block matching for a block image represented by the block number, thereby detecting a motion vector for the block image.

The total number of blocks is x/p×y/q, and the respective block images of the imaged frame Fa can be identified by blocks numbers 1 to x/p×y/q.

More specifically, the block matching circuit 34 compares a subject block image of a current frame Fa and an arbitrary block image in a searching area of a previous frame Fa to detect a block with which mean square error is minimized, and determines a vector linking the subject block of the current frame Fa with the detected block of the previous frame Fa as a motion vector. The block matching circuit 34 supplies the block image of the current frame Fa to the spatial filtering unit 41 of the resolution converter 22, and supplies the motion vector of the block image to the controller 44.

Then, in step S4, the controller 44 of the resolution converter 22 calculates a moving velocity (movement amount v) with respect to the X-axis direction based on the motion vector supplied from the block matching circuit 34 of the movement-amount detector 21. Then, the controller 44, with reference to the internal table defining relationship between moving velocity v and decimation amount m, shown in FIG. 21, detects a decimation amount mx associated with the moving velocity (movement amount) v.

In step S5, the controller 44 determines a moving velocity (movement amount) v with respect to the Y-axis direction based on the motion vector supplied from the block matching circuit 34 of the movement-amount detector 21. Then, the controller 44, with reference to an internal table defining relationship between moving velocity v with respect to the Y-axis direction and decimation amount m, detects a decimation amount my associated with the moving velocity (movement amount) v.

Then, in step S6, the controller 44 of the resolution converter 22 controls the spatial filtering unit 41 to convert the block image (ip×jq pixels) of the imaged frame Fa supplied from the movement-amount detector 21 into an image having a resolution of mxp×myq pixels (refer to the left part of FIG. 20). That is, the spatial filtering unit 41 spatially filters the block image.

The controller 44, for example, when the decimation amount mx=4, controls the spatial filtering unit 41 to carry out spatial filtering so that an image having 4p×q pixels will be obtained. The controller 44, when the decimation amount mx=3, controls the spatial filtering unit 41 to carry out spatial filtering so that an image having 3p×q will be obtained. Although the description has been made in the context of pixels along the X-axis direction as an example, the same applies to pixels along the Y-axis direction.

Then, in step S7, the controller 44 controls the spatial decimation unit 42 to decimate the image supplied from the spatial filtering unit 41, having mxp×myq pixels, according to the decimation amounts mx and my determined in steps S4 and S5. Thus, the spatial decimation unit 42 decimates the block image supplied from the spatial filtering unit 41, having mxp×myq pixels, by the decimation amount mx with respect to the X-axis direction and by the decimation amount my with respect to the Y-axis direction. Thus, a block image having p×q pixels is obtained (refer to the right part of FIG. 20).

For example, when the decimation amount mx=4, the 4p×q pixels supplied from the spatial filtering unit 41 are decimated by the decimation amount of 4 with respect to the X-axis direction, whereby a block image having p×q pixels is generated. When the decimation amount mx=3, the 3p×q pixels supplied from the spatial filtering unit 41 are decimated by the decimation amount of 3 with respect to the X-axis direction, whereby a block image having p×q pixels is generated.

Although aliasing components occur when spatial decimation is carried out, since the decimation amounts mx and my satisfy the expression (8), the aliasing components cancel out each other.

The spatial decimation unit 42 supplies the decimated block images having p×q pixels to the frame memory 43. The frame memory 43 stores the block images at a specific location, and combines the block images into a single output frame Fb.

In step S8, the block matching circuit 34 of the movement-amount detector 21 increments the block number by 1.

The procedure then returns to step S2, and subsequent processing is executed.

When it is determined in step S2 that motion vectors have been detected for all the blocks, the procedure is exited.

As described above, by converting the resolution of a single imaged frame Fa by the processing from step S3 to step S7 on a block-by-block basis, a single output frame Fb is generated, and output frames are output from the output unit 13A at a predetermined frame rate.

Thus, when an image output from the output unit 13A is displayed, an observer is allowed to perceive an image with a large amount of movement at a resolution exceeding a resolution that can be represented by an actual number of pixels, i.e., at a resolution exceeding the resolution of the display object image Wb. By the super-resolution effect, the spatial resolution as perceived by the observer corresponds to a resolution (mxp×myq pixels) that is mx times as high with respect to the X-axis direction and my times as high with respect to the Y-axis direction as block images (p×q pixels) of the output frame Fb.

As described above, movement is detected in each block of an image, and spatial filtering and spatial decimation are carried out suitably by the spatial filtering unit 41 and the spatial decimation unit 42. Thus, the super-resolution effect is achieved in blocks having a certain amount of movement, and aliasing noise is suppressed in blocks in which movement is small, so that images of a good quality are perceived as a whole.

Figure 24A:
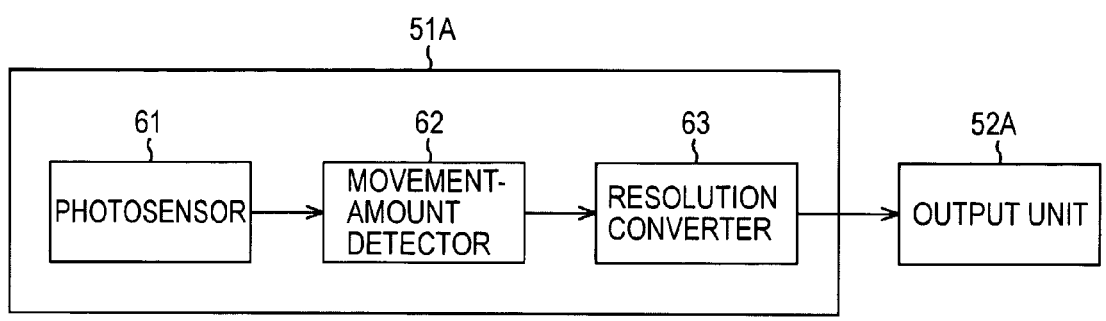
FIG. 24 is a block diagram showing example constructions of an imaging device and an image display device according to another embodiment of the present invention.

FIG. 24A shows an imaging device according to another embodiment of the present invention. The imaging device internally has a function of converting an image.

The imaging device includes an imaging unit 51A and an output unit 52A. The imaging unit 51A is implemented by a CMOS device. A CMOS imaging device allows photosensor elements and processing elements to be simultaneously mounted thereon.

The imaging unit 51A includes a photosensor 61, a movement-amount detector 62, and a resolution converter 63.

The photosensor 61 includes a two-dimensional array of photosensor elements that receive light and convert the light into electric signals. The photosensor 61 converts analog signals obtained by photoelectric conversion into digital signals in an internal data format.

Figure 18A:
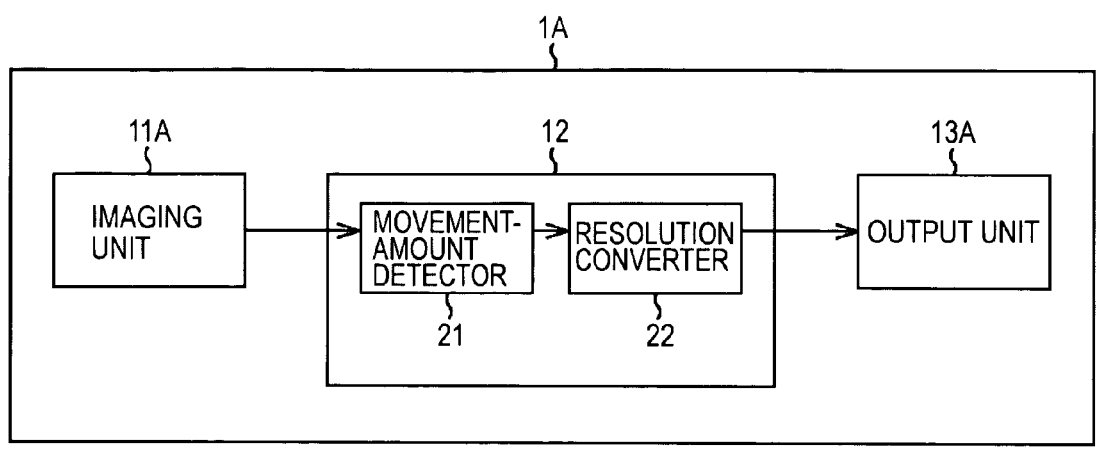
FIGS. 18A and 18B are diagrams showing example constructions of an imaging device and an image display device according to embodiments of the present invention.

The movement-amount detector 62 is implemented by a circuit on the imaging unit 51A, the circuit being similarly configured as the movement-amount detector 21 in the example shown in FIG. 18A.

The resolution converter 63 is implemented by a circuit on the imaging unit 51A, the circuit being similarly configured as the resolution converter 22 in the example shown in FIG. 18A.

Since the imaging device according to this embodiment is advantageous for displaying images at a high frame rate, the imaging elements in the photosensor 61 are adapted to be capable of imaging at a high frame rate.

The output unit 52A has the same function as the output unit 13A in the example shown in FIG. 18A.

The series of processes described above may be implemented in hardware or in software. When the series of processes is implemented in software, a program of the software is installed on a computer so that the program can be executed by the computer, whereby the functions of the moving-image converting device 1A described above are implemented.

Figure 24B:
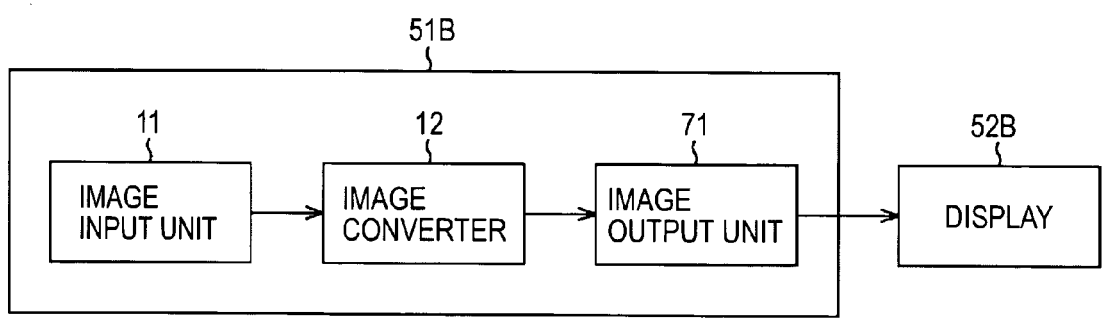

FIG. 24B shows the construction of an image processing apparatus 51B according to an embodiment of the present invention. The image processing apparatus 51B, as compared with the image display apparatus 1B shown in FIG. 18B, includes an image output unit 71 instead of the image display unit 13B. The other parts of the image processing apparatus 51B are the same as the corresponding parts of the image display apparatus 1B, so that descriptions thereof will be omitted.

Figure 18B:
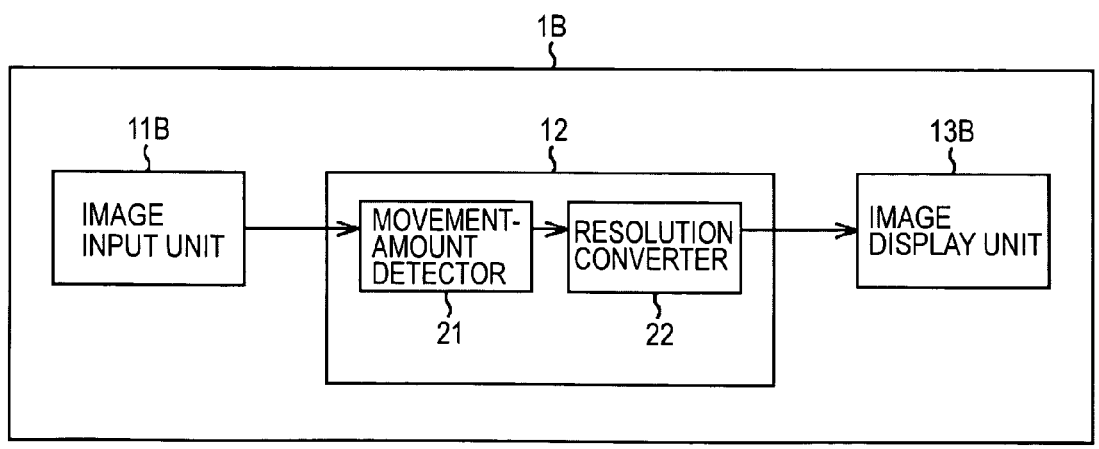

The image converter 12 of the image processing apparatus 51B, similarly to the example shown in FIG. 18B, converts an input frame Fa input from the image input unit 11B into a display frame Fb having a resolution that can be represented by a display 52B. The image converter 12 outputs the display frame Fb to the image output unit 71.

The image output unit 71 converts image signals of the display frame Fb supplied from the image converter 12 into image signals in a format acceptable by the display 52B, and outputs the image signals to the display 52B. The display 52B is constructed basically the same as the image display 13B shown in FIG. 18B, and it displays an image corresponding to the image signals supplied from the image output unit 71 of the image processing apparatus 51B.

As described above, the present invention can be applied to an image processing apparatus not including a display.

The series of processes described above may be implemented in hardware or in software. When the series of processes is implemented in software, a program of the software is installed on a computer so that the program can be executed by the computer, whereby the functions of the moving-image converting device 1A described above are implemented.

Figure 25:
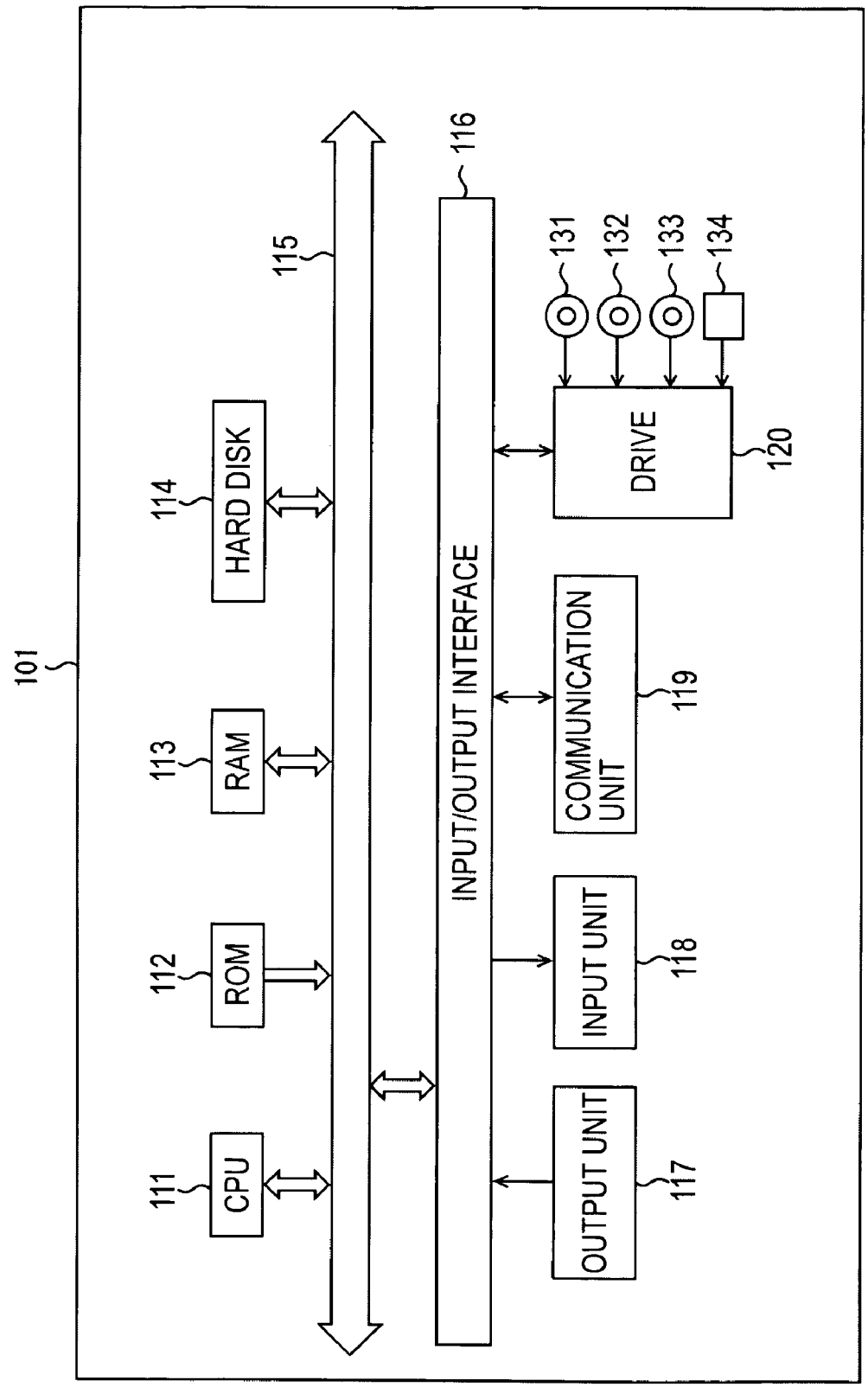
FIG. 25 is a block diagram showing an example construction of a personal computer.

FIG. 25 is a block diagram showing an embodiment of the present invention, in which a computer 101 functions as the imaging device 1A, the imaging device 51A, the image display 1B, or the image display 51B.

A central processing unit (CPU) 111 is connected to an input/output interface 116 via a bus 115. The CPU 111, upon receiving a command input by a user from an input unit 118 including a keyboard and a mouse, loads into a random access memory (RAM) 113 a program stored in, for example, a read-only memory (ROM) 112, a hard disk 114, or a recording medium loaded on a drive 120, such as a magnetic disk 131, an optical disk 132, a magneto-optical disk 133, or a semiconductor memory 134.

Figure 23:
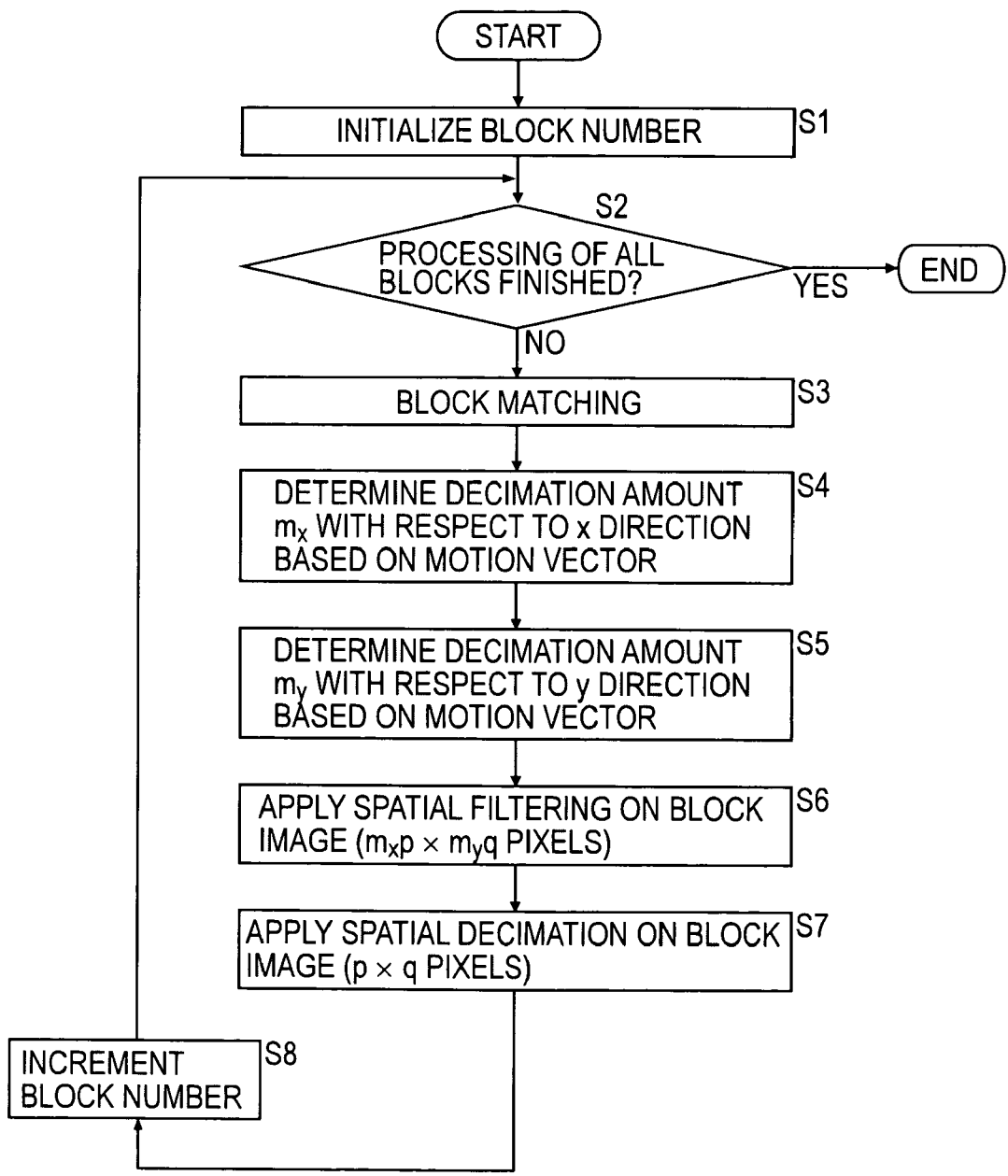
FIG. 23 is a flowchart showing an operation of an image converter shown in FIG. 19.

Thus, the various processes described above, such as the process shown in the flowchart in FIG. 23, are executed.

Furthermore, the CPU 111 outputs, as required, a processing result to a display 117 implemented, for example, by a liquid crystal display (LCD), via the input/output interface 116.

The program may be stored in advance in the hard disk 114 or the ROM 112 and provided to a user together with the computer 101. Alternatively, the program may be provided in the form of a package medium such as the magnetic disk 131, the optical disk 132, the magneto-optical disk 133, or the semiconductor memory 134. Yet alternatively, the program may be provided to the hard disk 114 via a communication unit 119 from a satellite or through a network.

In this specification, steps defining the program provided by the recording medium need not necessarily be executed in the order described, and may be executed individually or in parallel.

What is claimed is:

1. An image processing method comprising the steps of:
    an image input step of inputting first image signals having a first image resolution and correlated to an image into a processing apparatus;
    a relative movement detecting step effected by said processing apparatus of detecting relative movement within at least one region of said first image frame of said first;
    a resolution converting step effected by said processing apparatus of converting the first image signals input in the image input step into second image signals having at least a second image resolution, the second image resolution being lower than the first image resolution, an image resolution of the region within the second image signals being determined by the amount of relative movement detected within the region;
    an output step of outputting from said processing apparatus the second image signals having the second image resolution at a predetermined frame rate; and
    displaying the image on a display using the second image signals,
    wherein,
    the resolution converting step includes a spatial decimation step that imparts a visual effect that exhibits an image resolution higher than the second image resolution when the image signals output in the output step are displayed at the predetermined frame rate.

2. The image processing method according to claim 1, wherein the decimation factor in the spatial decimation step is determined based on the amount of relative movement in the region.

3. The image processing method according to claim 2, wherein, in the spatial decimation step, the decimation factor with respect to a horizontal direction is determined based on an amount of relative movement in the region with respect to the horizontal direction, and the decimation factor with respect to a vertical direction is determined based on an amount of movement in the region with respect to the vertical direction.

4. The image processing method according to claim 1, wherein the amount of decimation in the spatial decimation step is increased as the frame rate increases.

5. The image processing method according to claim 1, wherein, in the spatial decimation step, for each frame, the amount of spatial decimation is determined so that all aliasing components of decimated signals in a predetermined number of adjacent frames temporally preceding or succeeding the frame cancel each other.

6. The image processing method according to claim 1, wherein in the resolution converting step the processing apparatus applies the spatial decimation on signals obtained by spatially filtering the image signals obtained in the image input step.

7. An image processing method comprising:
    an image input step of inputting into a processing apparatus image signals having a first image resolution;
    a resolution converting step of converting the image signals obtained in the image input step into image signals having a second image resolution, the second image resolution being lower than the first resolution; and
    an output step of outputting from the processing apparatus an image corresponding to the image signals having the second resolution at a predetermined frame rate,
    wherein,
    in the resolution converting step the processing apparatus divides the image signals obtained in the image input step into a plurality of regions and detects amounts of relative movement in the respective regions, and sets amounts of spatial decimation for the respective regions based on the amounts of relative movement detected, and
    in the resolution converting step the processing apparatus applies spatial filtering on the respective regions of the image signals obtained in the image input step before applying spatial decimation on the respective regions based on the amounts of spatial decimation set for the respective regions.

8. An image processing apparatus comprising:
    image input means via which image signals having a first image resolution can be input into the image processing apparatus;
    resolution converting means for converting the image signals obtained by the image input means into image signals having a second image resolution, the second image resolution being lower than the first image resolution; and
    output means via which the image signals having the second image resolution can be output from the image processing apparatus at a predetermined frame rate,
    wherein,
    the resolution converting means comprises a movement-amount detector for detecting an amount of relative movement in at least a partial region of an image corresponding to the image signals obtained by the image input means, and a resolution converter for converting image resolution of the region based on the amount of relative movement detected, and
    the resolution converting means carries out spatial decimation that provides a visual effect such that the image resulting from the conversion is characterized by an image resolution exceeding the second image resolution when image signals output by the output means are displayed at the predetermined frame rate.

9. The image processing apparatus according to claim 8, wherein the decimation factor in the spatial decimation is determined based on the amount of relative movement detected in the region.

10. The image processing apparatus according to claim 9, wherein, in the spatial decimation, the decimation factor with respect to a horizontal direction is determined based on an amount of relative movement in the region with respect to the horizontal direction, and the decimation factor with respect to a vertical direction is determined based on an amount of relative movement in the region with respect to the vertical direction.

11. The image processing apparatus according to claim 8, wherein, in the spatial decimation for each frame, the amount of spatial decimation is determined so that all aliasing components of decimated signals in a predetermined number of adjacent frames temporally preceding or succeeding the frame cancel each other.

12. The image processing apparatus according to claim 8, wherein the resolution converting means further comprises a storage unit for storing a table including an amount of spatial decimation associated with the amount of relative movement, and wherein the amount of spatial decimation in the spatial decimation is determined by referring to the table.

13. The image processing apparatus according to claim 8, wherein the resolution converting means applies the spatial decimation on signals obtained by spatially filtering the image signals obtained by the image input means.

14. An image processing apparatus comprising:
image input means via which image signals having a first image resolution can be input into the image processing apparatus;
resolution converting means for converting the image signals obtained by the image input means into image signals having a second image resolution, the second image resolution being lower than the first image resolution; and
output means via which the image signals having the second image resolution can be output from the image processing apparatus at a predetermined frame rate,
wherein,
the resolution converting means comprises a movement-amount detector for dividing the image signals obtained by the image input means into a plurality of regions and detecting amounts of relative movement in the respective regions, and a resolution converter for setting amounts of spatial decimation for the respective regions based on the amounts of relative movement detected and for applying spatial filtering on the respective regions of the image signals obtained by the image input means before applying spatial decimation on the respective regions based on the amounts of spatial decimation set for the respective regions.

15. The image processing apparatus according to claim 14, wherein the resolution converting means is mounted on a semiconductor device.

16. A computer readable storage medium on which is stored computer implemented instructions comprising the steps of any of claims 1-6 and 7, wherein the computer readable storage medium is selected from the group consisting of a read-only memory, a recordable magnetic disk, a recordable optical disk, a recordable magneto-optical disk, and a semiconductor memory.

* * * * *